United States Patent
Remsburg

(10) Patent No.: US 7,334,938 B2
(45) Date of Patent: Feb. 26, 2008

(54) MOLD AND FUNGUS GROWTH WARNING APPARATUS AND METHOD

(76) Inventor: Ralph Remsburg, 3626 Cobblefield Cir., Apt. 4, Caledonia, MI (US) 49316

( * ) Notice: Subject to any disclaimer, the term of this patent is extended or adjusted under 35 U.S.C. 154(b) by 113 days.

(21) Appl. No.: 11/056,508

(22) Filed: Feb. 11, 2005

(65) Prior Publication Data

US 2006/0146908 A1 Jul. 6, 2006

Related U.S. Application Data

(63) Continuation-in-part of application No. 11/028,389, filed on Jan. 3, 2005.

(51) Int. Cl.
- G01N 25/58 (2006.01)
- G01N 17/00 (2006.01)
- G08B 21/20 (2006.01)

(52) U.S. Cl. ............ 374/109; 374/45; 374/57; 374/28; 200/61.06; 340/522; 340/602

(58) Field of Classification Search ........... 374/109, 374/16, 28, 7, 102, 45, 57; 73/73; 340/602
See application file for complete search history.

(56) References Cited

U.S. PATENT DOCUMENTS

| | | | | |
|---|---|---|---|---|
| 3,595,070 A | * | 7/1971 | Smith | 73/73 |
| 3,831,450 A | * | 8/1974 | Schipke et al. | 374/102 |
| 3,958,028 A | * | 5/1976 | Burg | 426/418 |
| 4,403,296 A | * | 9/1983 | Prosky | 702/86 |
| 4,503,707 A | * | 3/1985 | Rosa et al. | 374/142 |
| D288,536 S | * | 3/1987 | Tanaka | D10/53 |
| 4,870,252 A | * | 9/1989 | Balmer | 392/446 |
| 5,105,366 A | * | 4/1992 | Beckey | 700/276 |
| 5,117,689 A | * | 6/1992 | Gary | 73/178 R |
| D378,900 S | * | 4/1997 | de Sieyes et al. | D10/52 |
| 5,648,231 A | * | 7/1997 | King | 435/34 |
| 5,651,498 A | * | 7/1997 | Meyer et al. | 236/44 C |
| 6,151,903 A | * | 11/2000 | Hironaka | 62/176.6 |
| 6,642,487 B2 | * | 11/2003 | Stanzel | 219/494 |
| 6,817,757 B1 | * | 11/2004 | Wallace | 374/120 |
| 7,240,029 B2 | * | 7/2007 | Kallestad | 705/34 |
| 2002/0010390 A1 | * | 1/2002 | Guice et al. | 600/300 |
| 2005/0011255 A1 | * | 1/2005 | Weisenberger et al. | 73/73 |
| 2005/0156746 A1 | * | 7/2005 | Remsburg | 340/602 |
| 2005/0165269 A9 | * | 7/2005 | Aboul-Hosn et al. | 600/16 |
| 2005/0282748 A1 | * | 12/2005 | Gong et al. | 514/12 |
| 2005/0285748 A1 | * | 12/2005 | Pedraza et al. | 340/602 |

FOREIGN PATENT DOCUMENTS

JP 11276194 10/1999

* cited by examiner

*Primary Examiner*—Gail Verbitsky
(74) *Attorney, Agent, or Firm*—Timothy M. Barlow

(57) ABSTRACT

An apparatus for monitoring environmental conditions favorable for mold, mildew and fungus growth includes a microprocessor having a data map, a temperature sensor attached to the microprocessor, a relative humidity sensor attached to the microprocessor, an indicator array attached to the microprocessor, and a power supply attached to the microprocessor. The map has a plurality of relative humidity and temperature combinations and one or more suggested actions, for the user, based on the combinations. The indicator array may be a single warning light or an array with a plurality of warning lights. The indicator array may also be a text display or an audio speaker for displaying one or more ambient conditions or suggested actions. Barometric pressure data may also be included with the map for more comprehensive suggestions for action.

12 Claims, 21 Drawing Sheets

Barometric Pressure is Steady or Rising

| FIGURE 5A | | FIGURE 5B | | FIGURE 5C | | FIGURE 5D | |
|---|---|---|---|---|---|---|---|
| R. Humidity <50% | | R. Humidity 50% to 69% | | R. Humidity 70% to 89% | | R. Humidity >89% | |
| T in °F | ACTIVE LED | T in °F | ACTIVE LED | T in °F | ACTIVE LED | T in °F | ACTIVE LED |
| ≤61 | GREEN | ≤61 | GREEN | ≤61 | GREEN | ≤61 | GREEN |
| 62 | GREEN | 62 | GREEN | 62 | GREEN | 62 | GREEN |
| 63 | GREEN | 63 | GREEN | 63 | GREEN | 63 | GREEN |
| 64 | GREEN | 64 | GREEN | 64 | GREEN | 64 | GREEN |
| 65 | GREEN | 65 | GREEN | 65 | GREEN | 65 | YELLOW |
| 66 | GREEN | 66 | GREEN | 66 | GREEN | 66 | YELLOW |
| 67 | GREEN | 67 | GREEN | 67 | GREEN | 67 | YELLOW |
| 68 | GREEN | 68 | GREEN | 68 | GREEN | 68 | YELLOW |
| 69 | GREEN | 69 | GREEN | 69 | GREEN | 69 | YELLOW |
| 70 | GREEN | 70 | GREEN | 70 | YELLOW | 70 | RED |
| 71 | GREEN | 71 | GREEN | 71 | YELLOW | 71 | RED |
| 72 | GREEN | 72 | GREEN | 72 | YELLOW | 72 | RED |
| 73 | GREEN | 73 | GREEN | 73 | YELLOW | 73 | RED |
| 74 | GREEN | 74 | GREEN | 74 | YELLOW | 74 | RED |
| 75 | GREEN | 75 | YELLOW | 75 | RED | 75 | FLASHING RED |
| 76 | GREEN | 76 | YELLOW | 76 | RED | 76 | FLASHING RED |
| 77 | GREEN | 77 | YELLOW | 77 | RED | 77 | FLASHING RED |
| 78 | GREEN | 78 | YELLOW | 78 | RED | 78 | FLASHING RED |
| 79 | GREEN | 79 | YELLOW | 79 | RED | 79 | FLASHING RED |
| 80 | GREEN | 80 | YELLOW | 80 | RED | 80 | FLASHING RED |
| 81 | GREEN | 81 | YELLOW | 81 | RED | 81 | FLASHING RED |
| 82 | GREEN | 82 | YELLOW | 82 | RED | 82 | FLASHING RED |
| 83 | GREEN | 83 | YELLOW | 83 | RED | 83 | FLASHING RED |
| 84 | GREEN | 84 | YELLOW | 84 | RED | 84 | FLASHING RED |
| 85 | GREEN | 85 | YELLOW | 85 | RED | 85 | FLASHING RED |
| 86 | GREEN | 86 | YELLOW | 86 | RED | 86 | FLASHING RED |
| 87 | GREEN | 87 | YELLOW | 87 | RED | 87 | FLASHING RED |
| 88 | GREEN | 88 | YELLOW | 88 | RED | 88 | FLASHING RED |
| 89 | GREEN | 89 | GREEN | 89 | YELLOW | 89 | RED |
| 90 | GREEN | 90 | GREEN | 90 | YELLOW | 90 | RED |
| 91 | GREEN | 91 | GREEN | 91 | YELLOW | 91 | RED |
| 92 | GREEN | 92 | GREEN | 92 | YELLOW | 92 | RED |
| 93 | GREEN | 93 | GREEN | 93 | YELLOW | 93 | RED |
| 94 | GREEN | 94 | GREEN | 94 | YELLOW | 94 | YELLOW |
| 95 | GREEN | 95 | GREEN | 95 | YELLOW | 95 | YELLOW |
| 96 | GREEN | 96 | GREEN | 96 | YELLOW | 96 | YELLOW |
| 97 | GREEN | 97 | GREEN | 97 | YELLOW | 97 | YELLOW |
| 98 | GREEN | 98 | GREEN | 98 | YELLOW | 98 | YELLOW |
| 99 | GREEN | 99 | GREEN | 99 | YELLOW | 99 | YELLOW |
| 100 | GREEN | 100 | GREEN | 100 | YELLOW | 100 | YELLOW |
| 101 | GREEN | 101 | GREEN | 101 | YELLOW | 101 | YELLOW |
| 102 | GREEN | 102 | GREEN | 102 | YELLOW | 102 | YELLOW |
| 103 | GREEN | 103 | GREEN | 103 | YELLOW | 103 | YELLOW |
| 104 | GREEN | 104 | GREEN | 104 | GREEN | 104 | GREEN |
| ≥105 | GREEN | ≥105 | GREEN | ≥105 | GREEN | ≥105 | GREEN |

Barometric Pressure is Steady or Rising

Mold and Fungus Growth Warning Apparatus LED Algorithm When Barometric Pressure is Rising or Steady T values in °F
RH values in %
BP rising when $BP_{-2hr} < BP_{-1hr} < BP_{current}$
BP steady when $BP_{-2hr} \approx BP_{-1hr} \approx BP_{current}$
BP falling when $BP_{-2hr} > BP_{-1hr} > BP_{current}$ IF BP rising or steady THEN
IF T<65 OR T>103, Light=Green
IF RH<50, Light=Green IF RH>49 AND RH<70 AND T>74 AND T<89 THEN Light = Yellow IF RH>69 AND RH<90 AND T>69 AND T<75 THEN Light = Yellow
IF RH>69 AND RH<90 AND T>88 AND T<104 THEN Light = Yellow
IF RH>69 AND RH<90 AND T>74 AND T<89 THEN Light = Red IF RH>89 AND T>64 AND T<70 THEN Light = Yellow
IF RH>89 AND T>93 AND T<104 THEN Light = Yellow
IF RH>89 AND T>69 AND T<75 THEN Light = Red
IF RH>89 AND T>88 AND T<94 THEN Light = Red
IF RH>89 AND T>74 AND T<89 THEN Light = Flashing Red THEN GOTO Figure 8

Fig. 6

Barometric Pressure is Steady or Rising

| FIGURE 7A | | FIGURE 7B | |
|---|---|---|---|
| Relative Humidity <50% | | Relative Humidity 50% to 69% | |
| T in °F | Digital Display | T in °F | Digital Display |
| ≤61 | Logo | ≤61 | Logo |
| 62 | Logo | 62 | Logo |
| 63 | Logo | 63 | Logo |
| 64 | Logo | 64 | Logo |
| 65 | Logo | 65 | Logo |
| 66 | Logo | 66 | Logo |
| 67 | Logo | 67 | Logo |
| 68 | Logo | 68 | Logo |
| 69 | Logo | 69 | Logo |
| 70 | Logo | 70 | Logo |
| 71 | Logo | 71 | Logo |
| 72 | Logo | 72 | Logo |
| 73 | Logo | 73 | Logo |
| 74 | Logo | 74 | Logo |
| 75 | Logo | 75 | Turn On A/C or HTR Until Temperature is below 75°F or above 88°F |
| 76 | Logo | 76 | Turn On A/C or HTR Until Temperature is below 75°F or above 88°F |
| 77 | Logo | 77 | Turn On A/C or HTR Until Temperature is below 75°F or above 88°F |
| 78 | Logo | 78 | Turn On A/C or HTR Until Temperature is below 75°F or above 88°F |
| 79 | Logo | 79 | Turn On A/C or HTR Until Temperature is below 75°F or above 88°F |
| 80 | Logo | 80 | Turn On A/C or HTR Until Temperature is below 75°F or above 88°F |
| 81 | Logo | 81 | Turn On A/C or HTR Until Temperature is below 75°F or above 88°F |
| 82 | Logo | 82 | Turn On A/C or HTR Until Temperature is below 75°F or above 88°F |
| 83 | Logo | 83 | Turn On A/C or HTR Until Temperature is below 75°F or above 88°F |
| 84 | Logo | 84 | Turn On A/C or HTR Until Temperature is below 75°F or above 88°F |
| 85 | Logo | 85 | Turn On A/C or HTR Until Temperature is below 75°F or above 88°F |
| 86 | Logo | 86 | Turn On A/C or HTR Until Temperature is below 75°F or above 88°F |
| 87 | Logo | 87 | Turn On A/C or HTR Until Temperature is below 75°F or above 88°F |
| 88 | Logo | 88 | Turn On A/C or HTR Until Temperature is below 75°F or above 88°F |
| 89 | Logo | 89 | Logo |
| 90 | Logo | 90 | Logo |
| 91 | Logo | 91 | Logo |
| 92 | Logo | 92 | Logo |
| 93 | Logo | 93 | Logo |
| 94 | Logo | 94 | Logo |
| 95 | Logo | 95 | Logo |
| 96 | Logo | 96 | Logo |
| 97 | Logo | 97 | Logo |
| 98 | Logo | 98 | Logo |
| 99 | Logo | 99 | Logo |
| 100 | Logo | 100 | Logo |
| 101 | Logo | 101 | Logo |
| 102 | Logo | 102 | Logo |
| 103 | Logo | 103 | Logo |
| 104 | Logo | 104 | Logo |
| ≥105 | Logo | ≥105 | Logo |

Barometric Pressure is Steady or Rising

```
                Relative Humidity 70% to 89%
T in °F             Digital Display
≤61                 Logo
 62                 Logo
 63                 Logo
 64                 Logo
 65                 Logo
 66                 Logo
 67                 Logo
 68                 Logo
 69                 Logo
 70    Turn On A/C or HTR Until Temperature is below 70°F or above 103°F
 71    Turn On A/C or HTR Until Temperature is below 70°F or above 103°F
 72    Turn On A/C or HTR Until Temperature is below 70°F or above 103°F
 73    Turn On A/C or HTR Until Temperature is below 70°F or above 103°F
 74    Turn On A/C or HTR Until Temperature is below 70°F or above 103°F
 75    Turn On A/C or HTR Until Temperature is below 70°F or above 103°F
 76    Turn On A/C or HTR Until Temperature is below 70°F or above 103°F
 77    Turn On A/C or HTR Until Temperature is below 70°F or above 103°F
 78    Turn On A/C or HTR Until Temperature is below 70°F or above 103°F
 79    Turn On A/C or HTR Until Temperature is below 70°F or above 103°F
 80    Turn On A/C or HTR Until Temperature is below 70°F or above 103°F
 81    Turn On A/C or HTR Until Temperature is below 70°F or above 103°F
 82    Turn On A/C or HTR Until Temperature is below 70°F or above 103°F
 83    Turn On A/C or HTR Until Temperature is below 70°F or above 103°F
 84    Turn On A/C or HTR Until Temperature is below 70°F or above 103°F
 85    Turn On A/C or HTR Until Temperature is below 70°F or above 103°F
 86    Turn On A/C or HTR Until Temperature is below 70°F or above 103°F
 87    Turn On A/C or HTR Until Temperature is below 70°F or above 103°F
 88    Turn On A/C or HTR Until Temperature is below 70°F or above 103°F
 89    Turn On A/C or HTR Until Temperature is below 70°F or above 103°F
 90    Turn On A/C or HTR Until Temperature is below 70°F or above 103°F
 91    Turn On A/C or HTR Until Temperature is below 70°F or above 103°F
 92    Turn On A/C or HTR Until Temperature is below 70°F or above 103°F
 93    Turn On A/C or HTR Until Temperature is below 70°F or above 103°F
 94    Turn On A/C or HTR Until Temperature is below 70°F or above 103°F
 95    Turn On A/C or HTR Until Temperature is below 70°F or above 103°F
 96    Turn On A/C or HTR Until Temperature is below 70°F or above 103°F
 97    Turn On A/C or HTR Until Temperature is below 70°F or above 103°F
 98    Turn On A/C or HTR Until Temperature is below 70°F or above 103°F
 99    Turn On A/C or HTR Until Temperature is below 70°F or above 103°F
100    Turn On A/C or HTR Until Temperature is below 70°F or above 103°F
101    Turn On A/C or HTR Until Temperature is below 70°F or above 103°F
102    Turn On A/C or HTR Until Temperature is below 70°F or above 103°F
103    Turn On A/C or HTR Until Temperature is below 70°F or above 103°F
104                 Logo
≥105                Logo
```

Fig. 7C

Barometric Pressure is Steady or Rising

|  |  |
|---|---|
|  | Relative Humidity >89% |
| T in °F | Digital Display |
| ≤61 | Logo |
| 62 | Logo |
| 63 | Logo |
| 64 | Logo |
| 65 | Turn On A/C or HTR Until Temperature is below 64°F or above 103°F |
| 66 | Turn On A/C or HTR Until Temperature is below 64°F or above 103°F |
| 67 | Turn On A/C or HTR Until Temperature is below 64°F or above 103°F |
| 68 | Turn On A/C or HTR Until Temperature is below 64°F or above 103°F |
| 69 | Turn On A/C or HTR Until Temperature is below 64°F or above 103°F |
| 70 | Turn On A/C or HTR Until Temperature is below 64°F or above 103°F |
| 71 | Turn On A/C or HTR Until Temperature is below 64°F or above 103°F |
| 72 | Turn On A/C or HTR Until Temperature is below 64°F or above 103°F |
| 73 | Turn On A/C or HTR Until Temperature is below 64°F or above 103°F |
| 74 | Turn On A/C or HTR Until Temperature is below 64°F or above 103°F |
| 75 | Turn On A/C or HTR Until Temperature is below 64°F or above 103°F |
| 76 | Turn On A/C or HTR Until Temperature is below 64°F or above 103°F |
| 77 | Turn On A/C or HTR Until Temperature is below 64°F or above 103°F |
| 78 | Turn On A/C or HTR Until Temperature is below 64°F or above 103°F |
| 79 | Turn On A/C or HTR Until Temperature is below 64°F or above 103°F |
| 80 | Turn On A/C or HTR Until Temperature is below 64°F or above 103°F |
| 81 | Turn On A/C or HTR Until Temperature is below 64°F or above 103°F |
| 82 | Turn On A/C or HTR Until Temperature is below 64°F or above 103°F |
| 83 | Turn On A/C or HTR Until Temperature is below 64°F or above 103°F |
| 84 | Turn On A/C or HTR Until Temperature is below 64°F or above 103°F |
| 85 | Turn On A/C or HTR Until Temperature is below 64°F or above 103°F |
| 86 | Turn On A/C or HTR Until Temperature is below 64°F or above 103°F |
| 87 | Turn On A/C or HTR Until Temperature is below 64°F or above 103°F |
| 88 | Turn On A/C or HTR Until Temperature is below 64°F or above 103°F |
| 89 | Turn On A/C or HTR Until Temperature is below 64°F or above 103°F |
| 90 | Turn On A/C or HTR Until Temperature is below 64°F or above 103°F |
| 91 | Turn On A/C or HTR Until Temperature is below 64°F or above 103°F |
| 92 | Turn On A/C or HTR Until Temperature is below 64°F or above 103°F |
| 93 | Turn On A/C or HTR Until Temperature is below 64°F or above 103°F |
| 94 | Turn On A/C or HTR Until Temperature is below 64°F or above 103°F |
| 95 | Turn On A/C or HTR Until Temperature is below 64°F or above 103°F |
| 96 | Turn On A/C or HTR Until Temperature is below 64°F or above 103°F |
| 97 | Turn On A/C or HTR Until Temperature is below 64°F or above 103°F |
| 98 | Turn On A/C or HTR Until Temperature is below 64°F or above 103°F |
| 99 | Turn On A/C or HTR Until Temperature is below 64°F or above 103°F |
| 100 | Turn On A/C or HTR Until Temperature is below 64°F or above 103°F |
| 101 | Turn On A/C or HTR Until Temperature is below 64°F or above 103°F |
| 102 | Turn On A/C or HTR Until Temperature is below 64°F or above 103°F |
| 103 | Turn On A/C or HTR Until Temperature is below 64°F or above 103°F |
| 104 | Logo |
| ≥105 | Logo |

Fig. 7D

Barometric Pressure is Steady or Rising

Mold and Fungus Growth Warning Apparatus Algorithm

T values in °F
RH values in %
BP rising when $BP_{-2hr} < BP_{-1hr} < BP_{current}$
BP steady when $BP_{-2hr} \approx BP_{-1hr} \approx BP_{current}$
BP falling when $BP_{-2hr} > BP_{-1hr} > BP_{current}$ IF BP rising or steady THEN
IF T<65 OR T>103, Display = Logo
IF RH<50, Display = Logo IF RH>49 AND RH<70 AND T>74 AND T<89 THEN Display = "Turn On A/C or HTR Until Temperature is Below 75°F or Above 88°F"

IF RH>69 AND RH<90 AND T>69 AND T<104 THEN Display = "Turn On A/C or HTR Until Temperature is Below 70°F or Above 103°F"

IF RH>89 AND T>64 AND T<104 THEN Display = "Turn On A/C or HTR Until Temperature is Below 65°F or Above 103°F"

Fig. 8

Barometric Pressure is Falling

| FIGURE 9A | | FIGURE 9B | | FIGURE 9C | | FIGURE 9D | |
|---|---|---|---|---|---|---|---|
| R. Humidity <50% | | R. Humidity 50% to 69% | | R. Humidity 70% to 89% | | R. Humidity >89% | |
| T in °F | ACTIVE LED | T in °F | ACTIVE LED | T in °F | ACTIVE LED | T in °F | ACTIVE LED |
| ≤61 | GREEN | ≤61 | GREEN | ≤61 | GREEN | ≤61 | GREEN |
| 62 | GREEN | 62 | GREEN | 62 | GREEN | 62 | GREEN |
| 63 | GREEN | 63 | GREEN | 63 | GREEN | 63 | YELLOW |
| 64 | GREEN | 64 | GREEN | 64 | GREEN | 64 | YELLOW |
| 65 | GREEN | 65 | GREEN | 65 | GREEN | 65 | YELLOW |
| 66 | GREEN | 66 | GREEN | 66 | GREEN | 66 | YELLOW |
| 67 | GREEN | 67 | GREEN | 67 | GREEN | 67 | YELLOW |
| 68 | GREEN | 68 | GREEN | 68 | YELLOW | 68 | RED |
| 69 | GREEN | 69 | GREEN | 69 | YELLOW | 69 | RED |
| 70 | GREEN | 70 | GREEN | 70 | YELLOW | 70 | RED |
| 71 | GREEN | 71 | GREEN | 71 | YELLOW | 71 | RED |
| 72 | GREEN | 72 | GREEN | 72 | YELLOW | 72 | RED |
| 73 | GREEN | 73 | YELLOW | 73 | RED | 73 | FLASHING RED |
| 74 | GREEN | 74 | YELLOW | 74 | RED | 74 | FLASHING RED |
| 75 | GREEN | 75 | YELLOW | 75 | RED | 75 | FLASHING RED |
| 76 | GREEN | 76 | YELLOW | 76 | RED | 76 | FLASHING RED |
| 77 | GREEN | 77 | YELLOW | 77 | RED | 77 | FLASHING RED |
| 78 | GREEN | 78 | YELLOW | 78 | RED | 78 | FLASHING RED |
| 79 | GREEN | 79 | YELLOW | 79 | RED | 79 | FLASHING RED |
| 80 | GREEN | 80 | YELLOW | 80 | RED | 80 | FLASHING RED |
| 81 | GREEN | 81 | YELLOW | 81 | RED | 81 | FLASHING RED |
| 82 | GREEN | 82 | YELLOW | 82 | RED | 82 | FLASHING RED |
| 83 | GREEN | 83 | YELLOW | 83 | RED | 83 | FLASHING RED |
| 84 | GREEN | 84 | YELLOW | 84 | RED | 84 | FLASHING RED |
| 85 | GREEN | 85 | YELLOW | 85 | RED | 85 | FLASHING RED |
| 86 | GREEN | 86 | YELLOW | 86 | RED | 86 | FLASHING RED |
| 87 | GREEN | 87 | YELLOW | 87 | RED | 87 | FLASHING RED |
| 88 | GREEN | 88 | YELLOW | 88 | RED | 88 | FLASHING RED |
| 89 | GREEN | 89 | YELLOW | 89 | RED | 89 | FLASHING RED |
| 90 | GREEN | 90 | YELLOW | 90 | RED | 90 | FLASHING RED |
| 91 | GREEN | 91 | GREEN | 91 | YELLOW | 91 | RED |
| 92 | GREEN | 92 | GREEN | 92 | YELLOW | 92 | RED |
| 93 | GREEN | 93 | GREEN | 93 | YELLOW | 93 | RED |
| 94 | GREEN | 94 | GREEN | 94 | YELLOW | 94 | RED |
| 95 | GREEN | 95 | GREEN | 95 | YELLOW | 95 | RED |
| 96 | GREEN | 96 | GREEN | 96 | YELLOW | 96 | YELLOW |
| 97 | GREEN | 97 | GREEN | 97 | YELLOW | 97 | YELLOW |
| 98 | GREEN | 98 | GREEN | 98 | YELLOW | 98 | YELLOW |
| 99 | GREEN | 99 | GREEN | 99 | YELLOW | 99 | YELLOW |
| 100 | GREEN | 100 | GREEN | 100 | YELLOW | 100 | YELLOW |
| 101 | GREEN | 101 | GREEN | 101 | YELLOW | 101 | YELLOW |
| 102 | GREEN | 102 | GREEN | 102 | YELLOW | 102 | YELLOW |
| 103 | GREEN | 103 | GREEN | 103 | YELLOW | 103 | YELLOW |
| 104 | GREEN | 104 | GREEN | 104 | YELLOW | 104 | YELLOW |
| 105 | GREEN | 105 | GREEN | 105 | YELLOW | 105 | YELLOW |
| ≥106 | GREEN | ≥106 | GREEN | ≥106 | GREEN | ≥106 | GREEN |

Barometric Pressure is Falling

Mold and Fungus Growth Warning Apparatus LED Algorithm When Barometric Pressure is Falling T values in °F
RH values in %
BP rising when $BP_{-2hr} < BP_{-1hr} < BP_{current}$
BP steady when $BP_{-2hr} \approx BP_{-1hr} \approx BP_{current}$
BP falling when $BP_{-2hr} > BP_{-1hr} > BP_{current}$ IF BP falling THEN
IF T<63 OR T>105, Light=Green
IF RH<50, Light=Green IF RH>49 AND RH<70 AND T>72 AND T<91 THEN Light = Yellow IF RH>69 AND RH<90 AND T>67 AND T<73 THEN Light = Yellow
IF RH>69 AND RH<90 AND T>90 AND T<106 THEN Light = Yellow
IF RH>69 AND RH<90 AND T>72 AND T<91 THEN Light = Red IF RH>89 AND T>62 AND T<68 THEN Light = Yellow
IF RH>89 AND T>95 AND T<106 THEN Light = Yellow
IF RH>89 AND T>67 AND T<73 THEN Light = Red
IF RH>89 AND T>90 AND T<96 THEN Light = Red
IF RH>89 AND T>72 AND T<91 THEN Light = Flashing Red THEN GOTO Figure 12

Fig. 10

Barometric Pressure is Falling

| FIGURE 11A Relative Humidity <50% | | FIGURE 11B Relative Humidity 50% to 69% | |
|---|---|---|---|
| T in °F | Digital Display | T in °F | Digital Display |
| ≤61 | Logo | ≤61 | Logo |
| 62 | Logo | 62 | Logo |
| 63 | Logo | 63 | Logo |
| 64 | Logo | 64 | Logo |
| 65 | Logo | 65 | Logo |
| 66 | Logo | 66 | Logo |
| 67 | Logo | 67 | Logo |
| 68 | Logo | 68 | Logo |
| 69 | Logo | 69 | Logo |
| 70 | Logo | 70 | Logo |
| 71 | Logo | 71 | Logo |
| 72 | Logo | 72 | Logo |
| 73 | Logo | 73 | Turn On A/C or HTR Until Temperature is below 73°F or above 90°F |
| 74 | Logo | 74 | Turn On A/C or HTR Until Temperature is below 73°F or above 90°F |
| 75 | Logo | 75 | Turn On A/C or HTR Until Temperature is below 73°F or above 90°F |
| 76 | Logo | 76 | Turn On A/C or HTR Until Temperature is below 73°F or above 90°F |
| 77 | Logo | 77 | Turn On A/C or HTR Until Temperature is below 73°F or above 90°F |
| 78 | Logo | 78 | Turn On A/C or HTR Until Temperature is below 73°F or above 90°F |
| 79 | Logo | 79 | Turn On A/C or HTR Until Temperature is below 73°F or above 90°F |
| 80 | Logo | 80 | Turn On A/C or HTR Until Temperature is below 73°F or above 90°F |
| 81 | Logo | 81 | Turn On A/C or HTR Until Temperature is below 73°F or above 90°F |
| 82 | Logo | 82 | Turn On A/C or HTR Until Temperature is below 73°F or above 90°F |
| 83 | Logo | 83 | Turn On A/C or HTR Until Temperature is below 73°F or above 90°F |
| 84 | Logo | 84 | Turn On A/C or HTR Until Temperature is below 73°F or above 90°F |
| 85 | Logo | 85 | Turn On A/C or HTR Until Temperature is below 73°F or above 90°F |
| 86 | Logo | 86 | Turn On A/C or HTR Until Temperature is below 73°F or above 90°F |
| 87 | Logo | 87 | Turn On A/C or HTR Until Temperature is below 73°F or above 90°F |
| 88 | Logo | 88 | Turn On A/C or HTR Until Temperature is below 73°F or above 90°F |
| 89 | Logo | 89 | Turn On A/C or HTR Until Temperature is below 73°F or above 90°F |
| 90 | Logo | 90 | Turn On A/C or HTR Until Temperature is below 73°F or above 90°F |
| 91 | Logo | 91 | Logo |
| 92 | Logo | 92 | Logo |
| 93 | Logo | 93 | Logo |
| 94 | Logo | 94 | Logo |
| 95 | Logo | 95 | Logo |
| 96 | Logo | 96 | Logo |
| 97 | Logo | 97 | Logo |
| 98 | Logo | 98 | Logo |
| 99 | Logo | 99 | Logo |
| 100 | Logo | 100 | Logo |
| 101 | Logo | 101 | Logo |
| 102 | Logo | 102 | Logo |
| 103 | Logo | 103 | Logo |
| 104 | Logo | 104 | Logo |
| ≥105 | Logo | ≥105 | Logo |

Barometric Pressure is Falling

| T in °F | Relative Humidity 70% to 89%<br>Digital Display |
|---|---|
| ≤61 | Logo |
| 62 | Logo |
| 63 | Logo |
| 64 | Logo |
| 65 | Logo |
| 66 | Logo |
| 67 | Logo |
| 68 | Turn On A/C or HTR Until Temperature is below 68°F or above 105°F |
| 69 | Turn On A/C or HTR Until Temperature is below 68°F or above 105°F |
| 70 | Turn On A/C or HTR Until Temperature is below 68°F or above 105°F |
| 71 | Turn On A/C or HTR Until Temperature is below 68°F or above 105°F |
| 72 | Turn On A/C or HTR Until Temperature is below 68°F or above 105°F |
| 73 | Turn On A/C or HTR Until Temperature is below 68°F or above 105°F |
| 74 | Turn On A/C or HTR Until Temperature is below 68°F or above 105°F |
| 75 | Turn On A/C or HTR Until Temperature is below 68°F or above 105°F |
| 76 | Turn On A/C or HTR Until Temperature is below 68°F or above 105°F |
| 77 | Turn On A/C or HTR Until Temperature is below 68°F or above 105°F |
| 78 | Turn On A/C or HTR Until Temperature is below 68°F or above 105°F |
| 79 | Turn On A/C or HTR Until Temperature is below 68°F or above 105°F |
| 80 | Turn On A/C or HTR Until Temperature is below 68°F or above 105°F |
| 81 | Turn On A/C or HTR Until Temperature is below 68°F or above 105°F |
| 82 | Turn On A/C or HTR Until Temperature is below 68°F or above 105°F |
| 83 | Turn On A/C or HTR Until Temperature is below 68°F or above 105°F |
| 84 | Turn On A/C or HTR Until Temperature is below 68°F or above 105°F |
| 85 | Turn On A/C or HTR Until Temperature is below 68°F or above 105°F |
| 86 | Turn On A/C or HTR Until Temperature is below 68°F or above 105°F |
| 87 | Turn On A/C or HTR Until Temperature is below 68°F or above 105°F |
| 88 | Turn On A/C or HTR Until Temperature is below 68°F or above 105°F |
| 89 | Turn On A/C or HTR Until Temperature is below 68°F or above 105°F |
| 90 | Turn On A/C or HTR Until Temperature is below 68°F or above 105°F |
| 91 | Turn On A/C or HTR Until Temperature is below 68°F or above 105°F |
| 92 | Turn On A/C or HTR Until Temperature is below 68°F or above 105°F |
| 93 | Turn On A/C or HTR Until Temperature is below 68°F or above 105°F |
| 94 | Turn On A/C or HTR Until Temperature is below 68°F or above 105°F |
| 95 | Turn On A/C or HTR Until Temperature is below 68°F or above 105°F |
| 96 | Turn On A/C or HTR Until Temperature is below 68°F or above 105°F |
| 97 | Turn On A/C or HTR Until Temperature is below 68°F or above 105°F |
| 98 | Turn On A/C or HTR Until Temperature is below 68°F or above 105°F |
| 99 | Turn On A/C or HTR Until Temperature is below 68°F or above 105°F |
| 100 | Turn On A/C or HTR Until Temperature is below 68°F or above 105°F |
| 101 | Turn On A/C or HTR Until Temperature is below 68°F or above 105°F |
| 102 | Turn On A/C or HTR Until Temperature is below 68°F or above 105°F |
| 103 | Turn On A/C or HTR Until Temperature is below 68°F or above 105°F |
| 104 | Turn On A/C or HTR Until Temperature is below 68°F or above 105°F |
| 105 | Turn On A/C or HTR Until Temperature is below 68°F or above 105°F |
| ≥106 | Logo |

Fig. 11C

Barometric Pressure is Falling

|  | Relative Humidity >89% |
|---|---|
| T in °F | Digital Display |
| ≤61 | Logo |
| 62 | Logo |
| 63 | Turn On A/C or HTR Until Temperature is below 63°F or above 105°F |
| 64 | Turn On A/C or HTR Until Temperature is below 63°F or above 105°F |
| 65 | Turn On A/C or HTR Until Temperature is below 63°F or above 105°F |
| 66 | Turn On A/C or HTR Until Temperature is below 63°F or above 105°F |
| 67 | Turn On A/C or HTR Until Temperature is below 63°F or above 105°F |
| 68 | Turn On A/C or HTR Until Temperature is below 63°F or above 105°F |
| 69 | Turn On A/C or HTR Until Temperature is below 63°F or above 105°F |
| 70 | Turn On A/C or HTR Until Temperature is below 63°F or above 105°F |
| 71 | Turn On A/C or HTR Until Temperature is below 63°F or above 105°F |
| 72 | Turn On A/C or HTR Until Temperature is below 63°F or above 105°F |
| 73 | Turn On A/C or HTR Until Temperature is below 63°F or above 105°F |
| 74 | Turn On A/C or HTR Until Temperature is below 63°F or above 105°F |
| 75 | Turn On A/C or HTR Until Temperature is below 63°F or above 105°F |
| 76 | Turn On A/C or HTR Until Temperature is below 63°F or above 105°F |
| 77 | Turn On A/C or HTR Until Temperature is below 63°F or above 105°F |
| 78 | Turn On A/C or HTR Until Temperature is below 63°F or above 105°F |
| 79 | Turn On A/C or HTR Until Temperature is below 63°F or above 105°F |
| 80 | Turn On A/C or HTR Until Temperature is below 63°F or above 105°F |
| 81 | Turn On A/C or HTR Until Temperature is below 63°F or above 105°F |
| 82 | Turn On A/C or HTR Until Temperature is below 63°F or above 105°F |
| 83 | Turn On A/C or HTR Until Temperature is below 63°F or above 105°F |
| 84 | Turn On A/C or HTR Until Temperature is below 63°F or above 105°F |
| 85 | Turn On A/C or HTR Until Temperature is below 63°F or above 105°F |
| 86 | Turn On A/C or HTR Until Temperature is below 63°F or above 105°F |
| 87 | Turn On A/C or HTR Until Temperature is below 63°F or above 105°F |
| 88 | Turn On A/C or HTR Until Temperature is below 63°F or above 105°F |
| 89 | Turn On A/C or HTR Until Temperature is below 63°F or above 105°F |
| 90 | Turn On A/C or HTR Until Temperature is below 63°F or above 105°F |
| 91 | Turn On A/C or HTR Until Temperature is below 63°F or above 105°F |
| 92 | Turn On A/C or HTR Until Temperature is below 63°F or above 105°F |
| 93 | Turn On A/C or HTR Until Temperature is below 63°F or above 105°F |
| 94 | Turn On A/C or HTR Until Temperature is below 63°F or above 105°F |
| 95 | Turn On A/C or HTR Until Temperature is below 63°F or above 105°F |
| 96 | Turn On A/C or HTR Until Temperature is below 63°F or above 105°F |
| 97 | Turn On A/C or HTR Until Temperature is below 63°F or above 105°F |
| 98 | Turn On A/C or HTR Until Temperature is below 63°F or above 105°F |
| 99 | Turn On A/C or HTR Until Temperature is below 63°F or above 105°F |
| 100 | Turn On A/C or HTR Until Temperature is below 63°F or above 105°F |
| 101 | Turn On A/C or HTR Until Temperature is below 63°F or above 105°F |
| 102 | Turn On A/C or HTR Until Temperature is below 63°F or above 105°F |
| 103 | Turn On A/C or HTR Until Temperature is below 63°F or above 105°F |
| 104 | Turn On A/C or HTR Until Temperature is below 63°F or above 105°F |
| 105 | Turn On A/C or HTR Until Temperature is below 63°F or above 105°F |
| ≥106 | Logo |

Fig. 11D

Barometric Pressure is Falling

Mold and Fungus Growth Warning Apparatus Algorithm

T values in °F
RH values in %
BP rising when $BP_{-2hr} < BP_{-1hr} < BP_{current}$
BP steady when $BP_{-2hr} \approx BP_{-1hr} \approx BP_{current}$
BP falling when $BP_{-2hr} > BP_{-1hr} > BP_{current}$ IF BP falling THEN
IF T<63 OR T>105, Display = Logo
IF RH<50, Display = Logo IF RH>49 AND RH<70 AND T>72 AND T<91 THEN Display = "Turn On A/C or HTR Until Temperature is Below 73°F or Above 90°F"

IF RH>69 AND RH<90 AND T>67 AND T<106 THEN Display = "Turn On A/C or HTR Until Temperature is Below 68°F or Above 105°F"

IF RH>89 AND T>62 AND T<106 THEN Display = "Turn On A/C or HTR Until Temperature is Below 63°F or Above 105°F"

Fig. 12

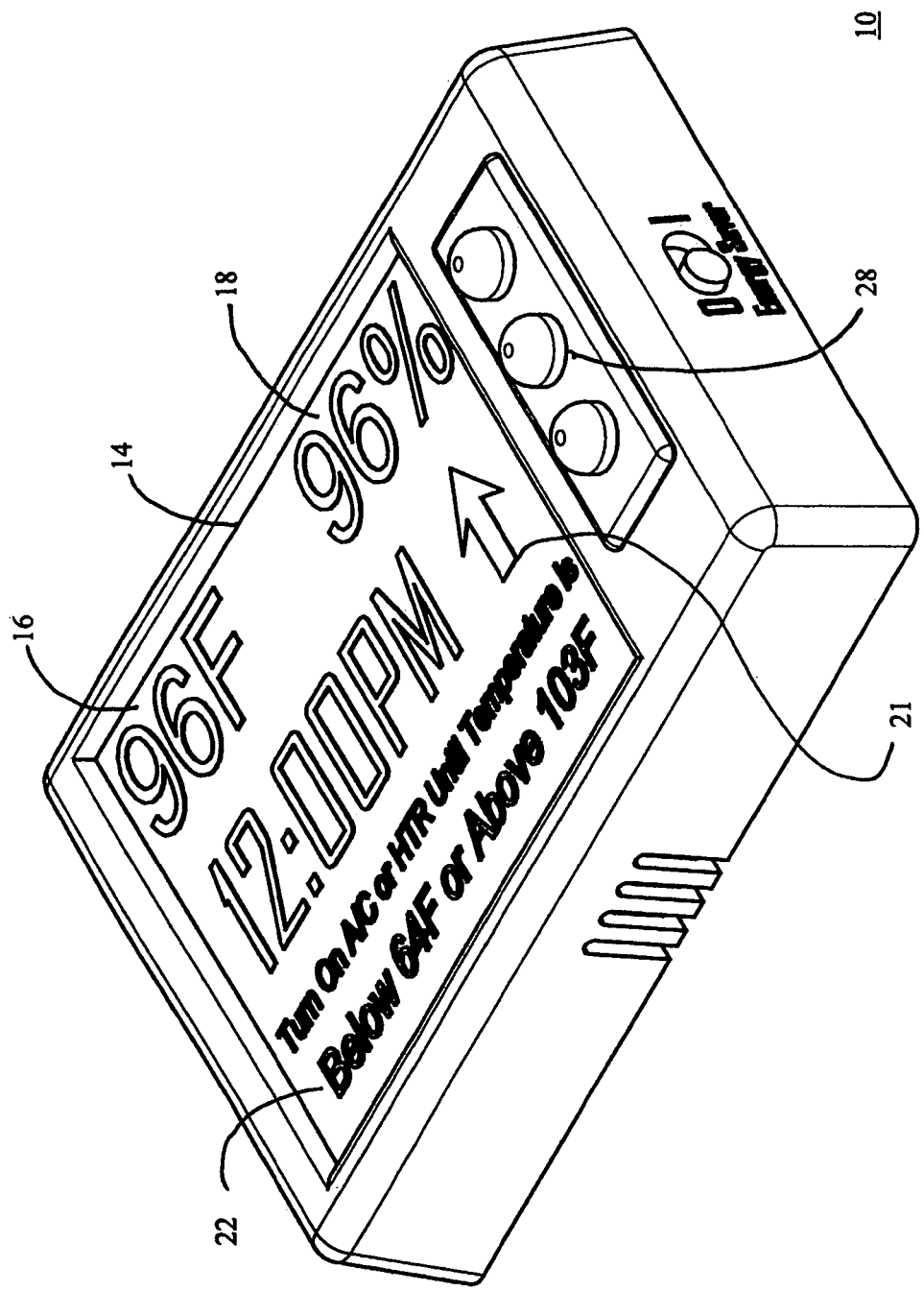

MOLD AND FUNGUS GROWTH WARNING APPARATUS AND METHOD

PRIORITY DATA

This application is a Continuation In Part under 37 CFR 1.53(b) and claims benefit of U.S. NonProvisional patent application Ser. No. 11/028,389 filed on Jan. 3, 2005.

FIELD OF THE INVENTION

This invention relates generally to devices for measuring environmental conditions that are favorable to undesirable organic growth, such as mold, mildew and fungi, and more specifically to a system that provides suggestions, based on the environmental conditions, to the user to reduce the threat of organic infestation.

BACKGROUND

Mold is a common allergen that can grow in many locations inside or outside a dwelling. It can also be found thriving inside building cavities, between walls. Mold is a very common indoor contaminant, and a common cause of illness. In a study of several hundred Tennessee homes in the United States, 49% had airborne concentrations of fungi greater than the concentration considered by some allergists to be acceptable to sensitive individuals. Only a few dozen of the thousands of different types of mold are commonly found in dwellings for humans.

Molds reproduce by releasing spores into the air. The spores are extremely small, about 1 micron or about 0.00004 inches. Mold counts are often 1,000 times higher than pollen counts. Although tiny parts of the parent mold colony can break off and be inhaled, usually, inhaled microscopic spores are the source of health problems. A person's allergic response is a biological reaction to the protein in mold, so the reaction can occur whether the inhaled spores are dead or alive. A thriving mold colony often releases various gases, including volatile organic compounds, that are also a problem for sensitive individuals.

Different species of mold have different health effects ranging from mild symptoms to death. In Cleveland, Ohio, in 1993, there were at least 34 cases of infants with bleeding in the lungs. The condition was related to the mold *Stachybotrys atra*. At least 10 deaths were recorded. Some species of the mold *Aspergillus* can infect the entire body of a person, causing lung damage or other serious illnesses. *Histoplasma capsulatum* can affect the lungs, but can also be systemic. A mold colony can use any organic material for food, and can even derive nutrition from a layer of dust on non-organic surfaces.

Mold requires five ingredients to thrive: food, air, a surface to grow upon, suitable temperature, and moisture. In an occupied building, little can be done to eliminate the first four conditions. In these instances, only the manipulation of moisture can be used to eliminate a mold colony or to prevent a new colony from forming. Another factor in mold growth is a change in barometric pressure. Sporalation can be encouraged by a reduction in the barometric pressure. In nature, a storm front and the accompanying higher humidity levels and wet weather are normally preceded by a reduction in barometric pressure.

Mold growth is related to relative humidity. Relative humidity levels below about 70% will not support excessive mold growth. However, indicated relative humidity levels below 70% do not ensure safety. Although a house may have 60% relative humidity, microclimates of higher relative humidity may exist throughout the house, especially near cooler surfaces. This is because cold air cannot support as much water moisture as warm air. Thus, for a given amount of water vapor in the air, the cooler air will have a higher relative humidity.

For example, assume the air in a house has a relative humidity of 60% at 21° C. (70° F.). The air outside the house is 10° C. (50° F.), and the air between the outside wall and the inner drywall is at 16° C. (60° F.). Furthermore, the air in the house and the air between the walls can circulate, which is very common. In this case, the 16° C. air within the wall cavity will have a relative humidity of 70%, and may support excessive mold growth.

BACKGROUND—DESCRIPTION OF PRIOR ART

Temperature, humidity and barometric pressure measurement are mature and well-developed arts. Numerous temperature and humidity measuring and monitoring devices have been developed. However, each of these devices has shortcomings making them inappropriate or ineffective for monitoring indoor environmental conditions for optimal mold and fungus growth conditions.

Some of these prior art devices measure rainfall and emphasize temperature measurements to determine the potential for mold growth. Other devices measure surface wetness, or condensed water vapor, to determine the potential for mold growth. These devices are of little use indoors.

Other devices measure temperature, relative humidity or barometric pressure, and will alert a user when a single predetermined parameter is observed. However, such existing devices are not capable of determining when a combination of two or more conditions is observed. For example, mold growth depends on a specific relationship between temperature and moisture. Neither a specific temperature or moisture value nor a range of temperature or moisture values will provide optimal conditions for mold growth. Both temperature and relative humidity must be compared to determine if conditions are right for mold or fungus growth.

Thus, there exists a need for a device that alerts a homeowner or dwelling occupant to the unobvious combination of environmental conditions that are conducive to unseen and destructive mold and fungus growth and assigns a threat level to the problem.

OBJECTS OF THE INVENTION

According to the present invention there is provided a device to monitor and measure temperature, relative humidity and barometric pressure conditions and an indicator to warn when environmental conditions are favorable for undesirable organic growth such as mold, mildew, and fungi. The device provides suggestions to the user to allow the informed user to take steps to reduce or eliminate the environmental conditions that are beneficial for such unwanted growth.

SUMMARY

In accordance with the present invention, a device is provided to monitor and measure temperature, humidity and barometric pressure conditions. The device reads the temperature, relative humidity and barometric pressure values from a data map to determine the corresponding hazard level for the combination of the temperature, relative humidity and barometric pressure conditions. The device indicates when environmental conditions are favorable or unfavorable for unseen and destructive organic infestations such as mold, mildew, and fungi. The relative hazard level is displayed visually or audibly. The rising level of potential for mold and fungus growth may be visually presented in a text display or on a traffic signal configuration. The text display provides a numeric representation of the environmental conditions. The traffic signal configuration shows the increasingly favorable growth conditions as a change from a green indicator, to a yellow indicator, to a red indicator, and finally to a flashing red indicator warning of extreme susceptibility for unseen mold and fungus growth. In addition, the device provides suggestions, via the text display, to allow a user to change the environmental conditions that contribute to the risk of organic infestation.

BRIEF DESCRIPTION OF THE DRAWINGS

FIGS. 5A to 5D show, in tabular form, examples of map data for various temperatures, relative humidity and barometric pressure conditions for the mold and fungus growth warning apparatus, in accordance with the invention;

FIG. 6 shows an algorithm for barometric pressure responses for the mold and fungus growth warning apparatus, in accordance with the invention;

FIGS. 7A to 7D show, in tabular form, examples of map data for various temperatures, relative humidity and barometric pressure conditions for the mold and fungus growth warning apparatus, in accordance with the invention;

FIG. 8 shows an algorithm for barometric pressure responses for the mold and fungus growth warning apparatus, in accordance with the invention;

FIGS. 9A to 9D show, in tabular form, examples of map data for various temperatures, relative humidity and barometric pressure conditions for the mold and fungus growth warning apparatus, in accordance with the invention;

FIG. 10 shows an algorithm for barometric pressure responses for the mold and fungus growth warning apparatus, in accordance with the invention;

FIGS. 11A to 11D show, in tabular form, examples of map data for various temperatures, relative humidity and barometric pressure conditions for the mold and fungus growth warning apparatus, in accordance with the invention;

FIG. 12 shows an algorithm for barometric pressure responses for the mold and fungus growth warning apparatus, in accordance with the invention;

FIG. 17 illustrates an isometric view of the current invention at the second warning level, in accordance with the invention.

DETAILED DESCRIPTION OF THE DRAWINGS

In accordance with the present invention, a device is provided to monitor temperature, humidity and barometric pressure conditions. The device reads the temperature, relative humidity and barometric pressure values from a data map to determine the corresponding hazard level for the observed temperature, relative humidity and barometric pressure conditions. The device indicates when environmental conditions are favorable or unfavorable for unseen and destructive organic infestations such as mold, mildew, and fungi. The device provides suggestions or instructions to the user to enable the user to change the combination of environmental conditions to reduce the risk of organic infestation.

Figure 1:
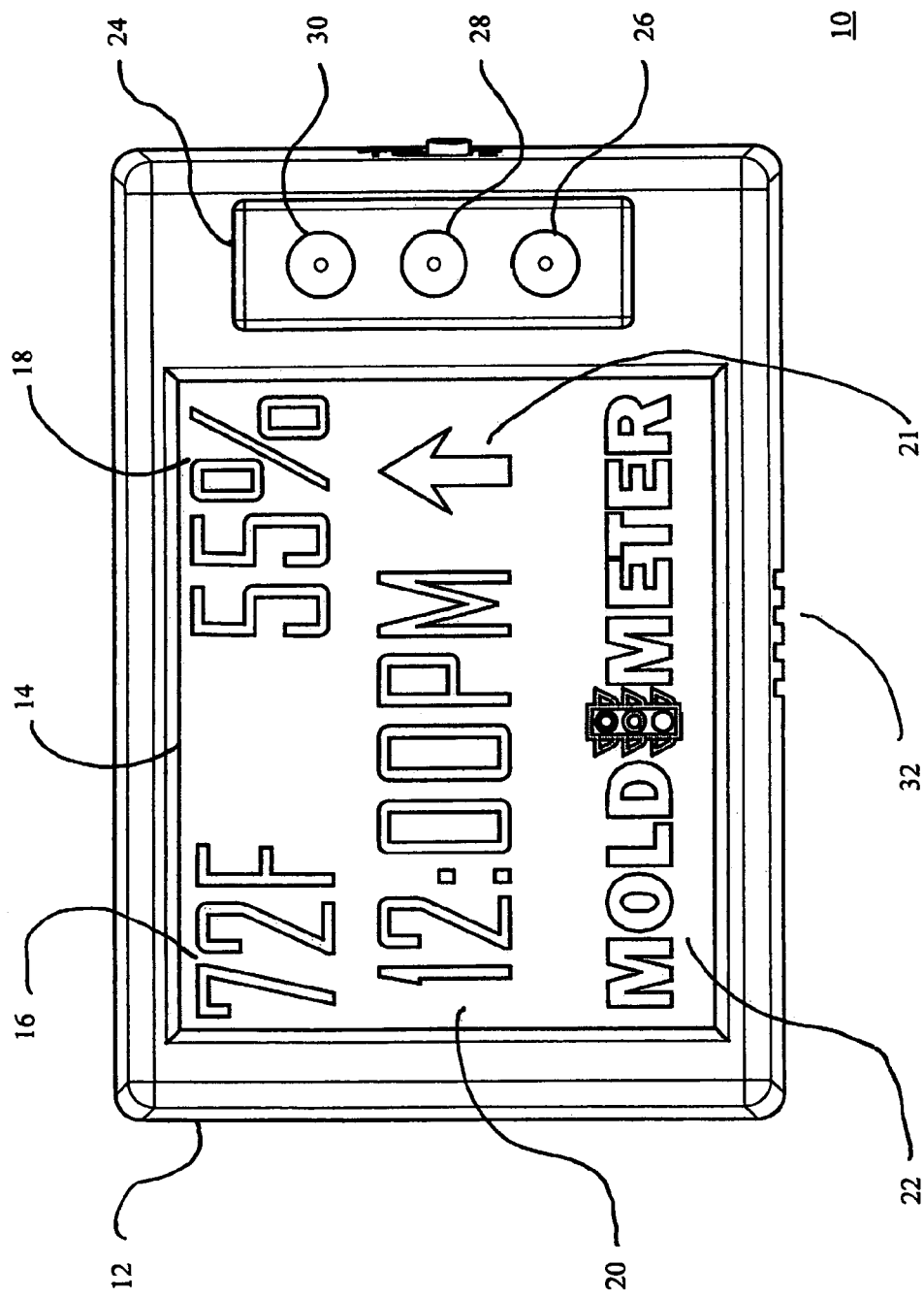
FIG. 1 shows a plan view of the mold and fungus growth warning apparatus, in accordance with the invention.

FIG. 1 shows a plan view of the mold and fungus growth warning apparatus 10, in accordance with the invention. The mold and fungus growth warning apparatus is primarily an electronic device enclosed in a mechanical housing 12. The housing 12 may be constructed from a low-cost injection moldable plastic such as ABS (Acrylonitrile Butadiene Styrene) although almost any material or combination of materials can be used.

An information display area 14 is located within housing 12. Many technologies such as CRT (Cathode Ray Tube), plasma screen, projection, and LCD (Liquid Crystal Display) can be used within information display area 14. In the embodiment shown in FIG. 1, the information display area 14 contains an LCD display because the technology is low cost, reliable, and has low power requirements. Numerous other options include CRT, plasma, LED and projection displays. The information display area 14 contains a temperature display 16 and a relative humidity display 18. The temperature display 16 can display the temperature in any desired units, but ° C. or ° F. are the preferred standard units. Likewise, the relative humidity display 18 uses percentage as the preferred units. The information display area 14 also includes a clock display 20 and a barometric pressure indicator 21 that indicates whether the ambient air pressure is rising, falling, or has remained steady over time. Alternatively, the display can also include a digital display of the barometric pressure. A suggestion display 22 within display area 14 is capable of displaying text messages for the benefit of the user. When no suggestions are required to be displayed the suggestion display 22 will show a logo or some other text when the apparatus is not in an alert mode. The configuration shown in FIG. 1 is just one possible arrangement.

The housing 12 shown in FIG. 1 shows a light display area 24. The light display area 24 has a green indicator 26, a yellow or amber indicator 28, and a red indicator 30 that illuminate selectively in response to specific combinations of temperature, relative humidity and barometric pressure. Because the mold and fungus warning apparatus 10 is an electronic device, LED (Light Emitting Diode) is the preferred technology for the indicators 26, 28, 30 due to their low power consumption and high visibility.

The housing 12 has a cavity opening 32 to allow ambient air to circulate inside the housing 12 where various sensors may be located.

Figure 2:
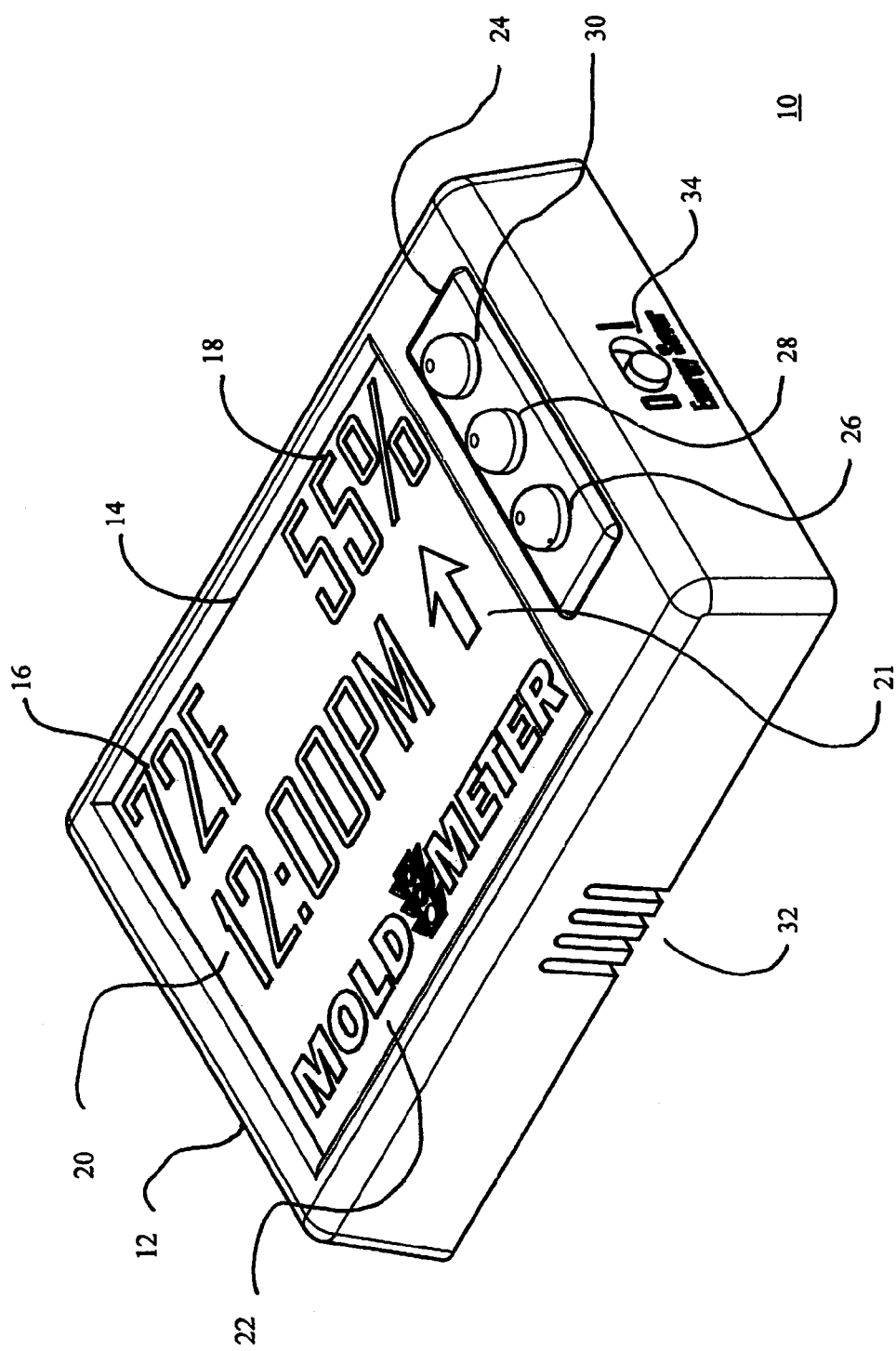
FIG. 2 shows an isometric view of the mold and fungus growth warning apparatus, in accordance with the invention.

FIG. 2 shows the light display area 24 as a raised platform, slightly above the level of the information display area 14. The green indicator 26, yellow indicator 28 and red indicator 30 protrude from the light display area 24. Location of the indicators 26, 28, 30 in this manner allows the indicators to be viewed at extreme angles beyond perpendicular to the housing 12 surface. An energy saver switch 34 is shown. The energy saver switch 34 is normally created from a two-position switch to more easily depict if the circuit is active or not. The energy saver switch 34 activates and deactivates the green indicator 26 based upon ambient conditions or user input.

Figure 3:
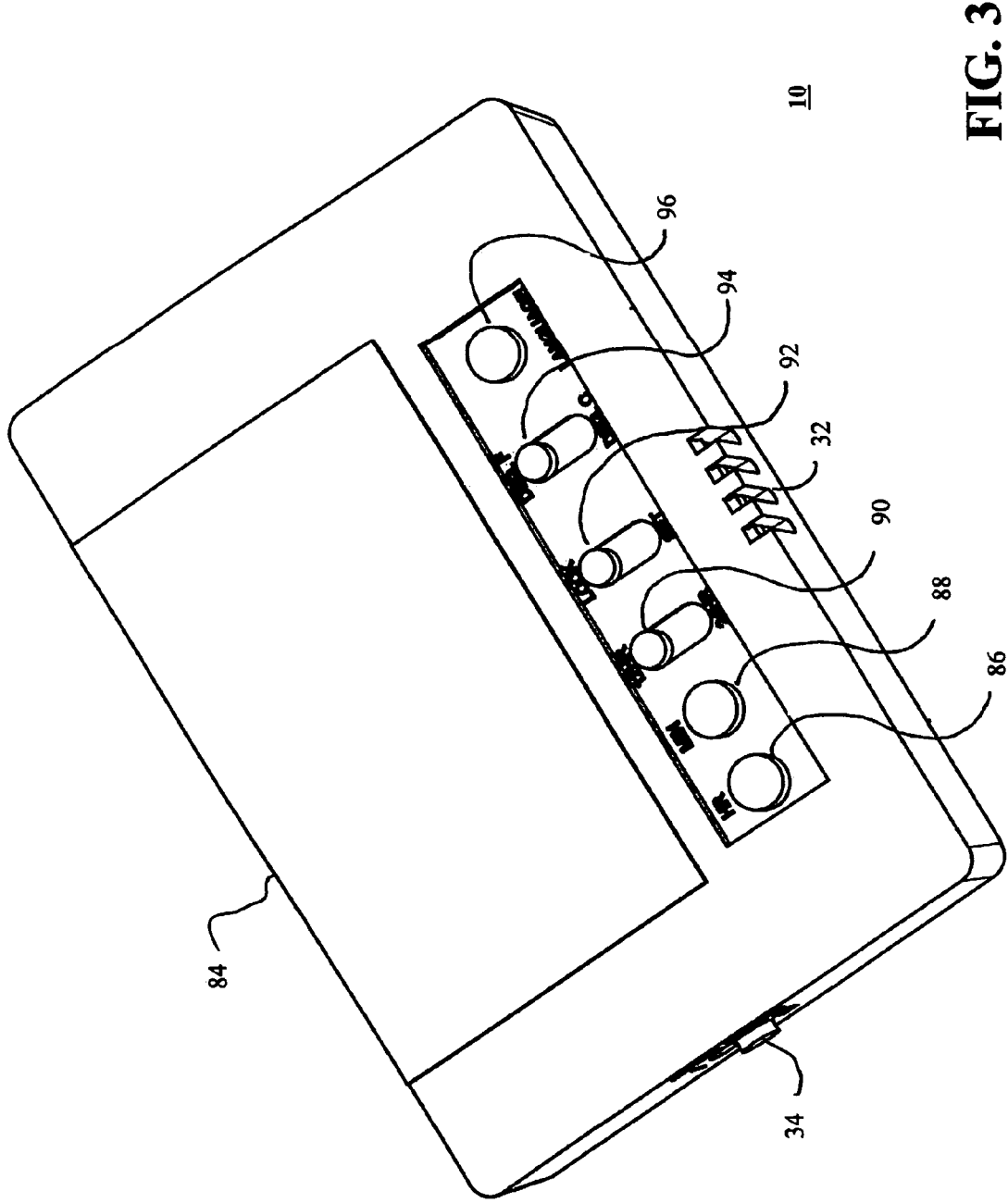
FIG. 3 depicts a rear isometric view of the mold and fungus growth warning apparatus, in accordance with the invention.

FIG. 3 shows a rear view of the mold and fungus growth warning apparatus 10. Batteries may be replaced by removing a battery replacement panel 84. To set the clock display 20, a change hours pushbutton 86, a change minutes pushbutton 88, and a change clock format from twelve hour format to twenty-four hour format switch 90 are provided, which can be altered while a change or lock clock settings switch 92 is in the set position. While switch 92 is in the set position the temperature units may be selected with the change temperature units from ° F. to ° C. 94, and the language for the suggestion display 22 may be selected with a change language pushbutton 96. The amount of memory required to store the map data, including the suggested actions is rather modest. Thus, numerous language options may be included, such as English, German, Spanish, French, Chinese, Japanese and many others. When the user has set the clock and selected his preferences, the change of lock settings switch 92 is set to the lock position to prevent inadvertent changes or inputs.

Figure 4:
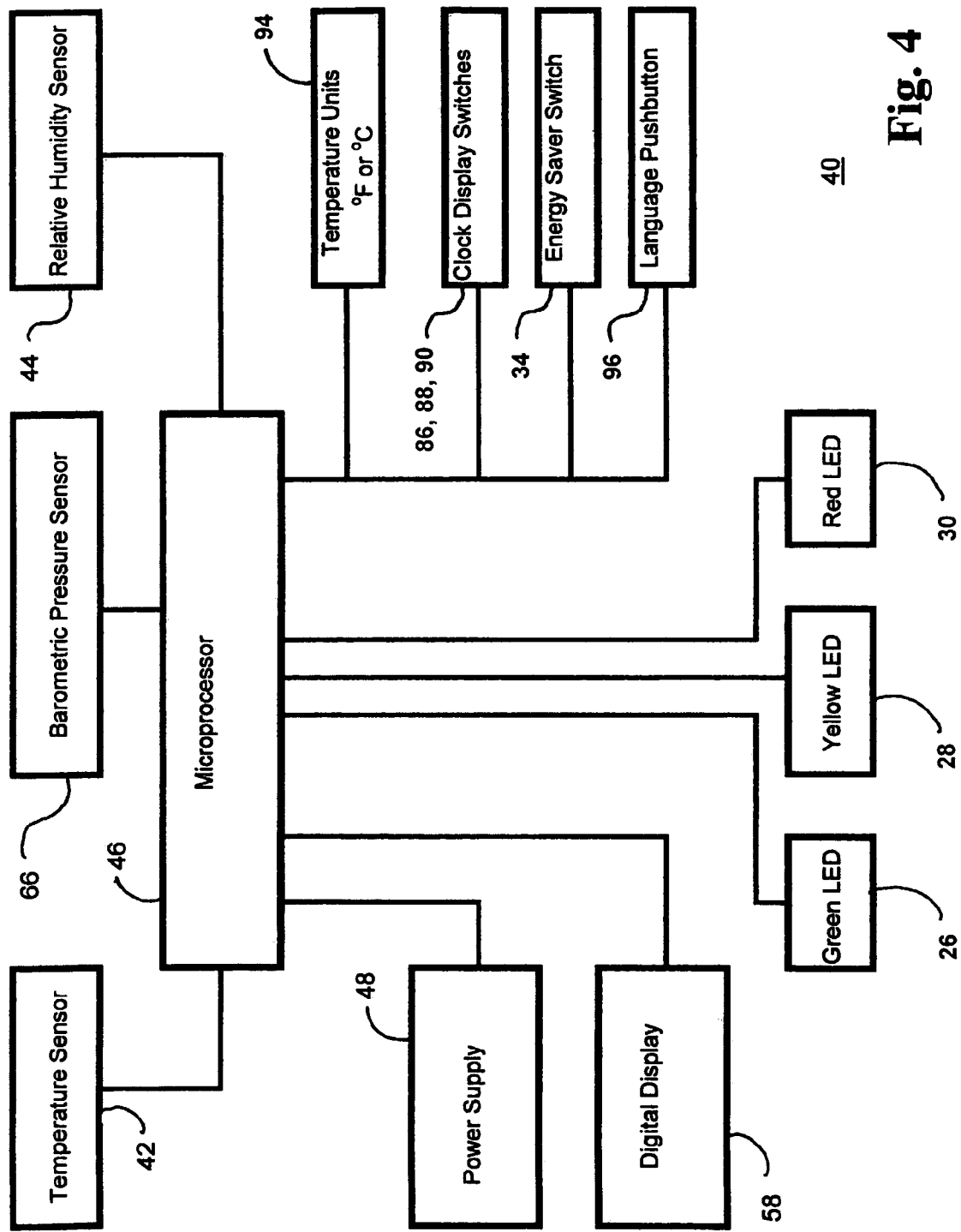
FIG. 4 depicts the electrical block diagram of the mold and fungus growth warning apparatus, in accordance with the invention.

FIG. 4 shows an electrical block diagram 40 of the mold and fungus growth warning apparatus 10. A temperature sensor 42, a relative humidity sensor 44 and a barometric pressure sensor 66 provide input signals to a microprocessor 46. Temperature, humidity, and pressure sensors are well known in the art. The sensors may be discreet components such as a thermistor and a resistive humidity sensor that require additional signal manipulation, or may contain temperature sensing and humidity sensing along with signal conditioning integrated into a single device. The Honeywell HIH-3602 series is typical of such integrated sensors. This Honeywell sensor combines a laser-trimmed thermoset polymer capacitive sensing element with on-chip signal conditioning. It has a thermistor or RTD in thermal contact with the relative humidity sensor. The temperature sensor 42 typically has an accuracy tolerance of ±2° F. (±1.1° C.) and a range of 32° F. to 122° F. (0° C. to 50° C.). The relative humidity sensor 44 typically has an accuracy tolerance of ±3% and a range of 20% to 95% in a non-condensing atmosphere. The barometric pressure sensor 66 typically has a tolerance of ±5%. Of course, higher or lower accuracies and ranges may be used according to the specific application and embodiment.

The requirements for the microprocessor 46 can be met by a variety of such devices. One of the most important requirements is low power consumption so that the power supply 48 may have an internal battery instead of external power. A device in the Motorola HCS08 series may be used for microprocessor 46. This series of devices has multiple power modes and an internal clock for auto wake-up to extend battery life. The battery power supply 48 will generally be comprised of one or more dry-cell batteries. Depending on microprocessor 46 selected by the manufacturer and other circuitry choices, additional power conditioning may be required.

An LCD digital display 58 in the information display area 14 shows real-time values from the temperature sensor 42, relative humidity sensor 44 and the internal clock of microprocessor 46. The display 58 may also include an indicator to show whether the barometric pressure is rising, falling, or has remained steady, over a period of time. The display 58 may also include a display of the current barometric pressure. Other values such as peak temperature, peak humidity, remote unit sensor readings, and other information, may also be displayed depending on the particular application and embodiment. Preferably, the apparatus has a temperature units switch 94, which is a two-position switch. A two-position energy saver switch 34 is used to turn off, or otherwise affect the operation of the green LED 26 to conserve battery power. Activating the energy saver switch 34 does not disable the apparatus. The switch only affects the power to the green LED 26. Typically, energy saver switch 34 would turn off the green LED 26 or cause it to flash intermittently. Clock display switches 86, 88, 90 control the clock display of digital display 58. The language pushbutton 96 allows the user to select his preferred language for the suggestion display 22 within the digital display 58.

Preferably, the green LED 26, yellow LED 28 and red LED 30 LED technology indicators have diameters of about 5 mm (0.197 inches) and a viewing angle of greater than 40° to meet the needs of most users. These LEDs are readily available and easily integrated into the design of the mold and fungus growth warning apparatus 10.

In another embodiment, the temperature sensor 42, relative humidity sensor 44 and barometric pressure sensor 66 are not physically connected to the microprocessor 46, but are in wireless communication with the microprocessor 46. Each sensor includes its own power source, such as a battery or AC power. When the wireless sensors use battery power, the microprocessor can receive battery status information to alert the user when any of the batteries need to be replaced. The wireless sensors permit the device to receive information from a wide variety of locations. This creates a tremendous amount of flexibility for the user with monitoring options. For example, the user could monitor the conditions in a room or building that is remotely located or that has a separate climate control system. Thus, the user would not need to be inside the remotely-located room or building to determine the relative mold and fungus growth risk. Alternatively, the wireless sensors could be used in addition to the temperature sensor 42, relative humidity sensor 44 and barometric pressure sensor 66 already attached to the microprocessor 46. The user would be able to compare conditions within a single building or among one or more buildings with a single mold and fungus growth warning apparatus 10.

The visible displays may be replaced by or supplemented with an audio system. The audio system would provide audible signals to the user to indicate current alert levels. The digital map may include audio information to be played through a speaker system. Such a system can announce the alert level or the current temperature, relative humidity, and barometric pressure conditions, or any desired combination thereof. Thus, the user would not need to read such information directly from the mold and fungus growth warning apparatus 10. The device may announce the desired information only when conditions change, or at a predetermined time interval, or any other desired parameters.

FIG. 5 shows an internal map of temperature and humidity combinations when the barometric air pressure is steady or rising. The overall map is shown as a series of four columns, FIGS. 5A-5D, each column corresponding to a range of relative humidity levels.

FIG. 5A indicates which LEDs will illuminate for a given temperature when the relative humidity is below 50% and barometric pressure is steady or rising.

FIG. 5B indicates which LEDs will illuminate for a given temperature when the relative humidity is 50% through 69% and the barometric pressure is steady or rising.

FIG. 5C indicates which LEDs will illuminate for a given temperature when the relative humidity is 70% through 89% and the barometric pressure is steady or rising.

Finally, FIG. 5D indicates which LEDs will illuminate for a given temperature when the relative humidity is above 89% and barometric pressure is steady or rising.

FIG. 6 shows the algorithm for the operation of the LEDs 26, 28, 30 when the barometric air pressure is steady or rising. FIG. 6 represents the same information as shown in the tables of FIG. 5. Note that although FIGS. 5 and 6 only refer to temperature units of degrees Fahrenheit, it is understood that these temperature units are only the external display units corresponding to the internal electrical values of the temperature sensor 42. The determination of a barometric pressure trend, either falling or steady or rising, is made via comparing barometric pressure values regularly. In FIG. 6, the barometric pressure values are compared on an hourly basis. In this example, the current barometric pressure is compared to the two previous hourly values to arrive at a trend value. This trend value determines which data map to read for the purposes of providing suggested actions for the user.

FIG. 7 shows the map of suggested actions to be displayed when barometric pressure is steady or rising. The overall map is shown as a series of four columns, FIGS. 7A-7D, each column corresponding to a range of relative humidity levels.

FIG. 7A indicates which message or suggestion will be displayed for a given temperature when the relative humidity is below 50% and barometric pressure is steady or rising.

FIG. 7B indicates which message or suggestion will be displayed for a given temperature when the relative humidity is 50% through 69% and barometric pressure is steady or rising. The suggested action directs the user to turn on the air conditioning (A/C) or heater until the temperature is below 75° F. or above 88° F. to reduce the risk of organic infestation. Alternatively, the user may be directed to turn on a dehumidifier to reduce the relative humidity below 50%.

FIG. 7C indicates which message or suggestion will be displayed for a given temperature when the relative humidity is 70% through 89% and barometric pressure is steady or rising. The suggested action directs the user to turn on the air conditioning (A/C) or heater until the temperature is below 70° F. or above 103° F. to reduce the risk of organic infestation. Alternatively, the user may be directed to turn on a dehumidifier to reduce the relative humidity below 50% for temperature from 75-88° F., and below 70% for temperatures from 70-74° F. and 89-103° F.

FIG. 7D indicates which message or suggestion will be displayed for a given temperature when the relative humidity is above 89% and barometric pressure is steady or rising. The suggested action directs the user to turn on the air conditioning (A/C) or heater until the temperature is below 64° F. or above 103° F. to reduce the risk of organic infestation. Alternatively, the user may be directed to turn on a dehumidifier to reduce the relative humidity below 50% for temperature from 75-88° F., below 70% for temperatures from 70-74° F. and 89-103° F., and below 90% for temperatures from 65-69° F. These alternative suggested actions apply to FIG. 11 as well, though the temperature ranges may be slightly different.

FIG. 8 shows the algorithm for the operation of the digital display 58 when the barometric pressure is steady or rising. FIG. 8 represents the same information as shown in the tables of FIG. 7. Note that although FIGS. 7 and 8 only refer to temperature units of degrees Fahrenheit, it is understood that these temperature units are only external display units corresponding to the internal electrical values of the temperature sensor 42. The determination of a barometric pressure trend, either falling or steady or rising, is made via comparing barometric pressure values regularly. In FIG. 8, the barometric pressure values are compared on an hourly basis. In this example, the current barometric pressure is compared to the two previous hourly values to arrive at a trend value. This trend value determines which data map to enter for the purposes of providing suggested actions for the user.

FIG. 9 shows an internal map of temperature and humidity combinations when the barometric air pressure is falling. The overall map is shown as a series of four columns, FIGS. 9A-9D, each column corresponding to a range of relative humidity levels. The overall map is shown as a series of four maps.

FIG. 9A indicates which LEDs will illuminate for a given temperature when the relative humidity is below 50% and barometric pressure is falling.

FIG. 9B indicates which LEDs will illuminate for a given temperature when the relative humidity is 50% thru 69% and barometric pressure is falling.

FIG. 9C indicates which LEDs will illuminate for a given temperature when the relative humidity is 70% thru 89% and barometric pressure is falling.

FIG. 9D indicates which LEDs will illuminate for a given temperature when the relative humidity is above 89% and barometric pressure is falling.

FIG. 10 shows the algorithm for the operation of the LEDs 26, 28, 30 when the barometric air pressure is falling. FIG. 10 represents the same information as shown in the tables of FIG. 9. Note that although FIGS. 9 and 10 only refer to temperature units of degrees Fahrenheit, it is understood that these are only external display units corresponding to the internal electrical values of the temperature sensor 42. The determination of a barometric pressure trend, either falling or steady or rising, is made via comparing barometric pressure values regularly. In FIG. 10, the barometric pressure values are compared on an hourly basis. In this example, the current barometric pressure is compared to the two previous hourly values to arrive at a trend value. This trend value determines which data map to enter for the purposes of providing suggested actions for the user.

FIG. 11 shows the map of suggested actions to be displayed when the barometric pressure is falling. The overall map is shown as a series of four columns, FIGS. 11A-11D, each column corresponding to a range of relative humidity levels.

FIG. 11A indicates which message or suggestion will be displayed for a given temperature when the relative humidity is below 50% and barometric pressure is falling.

FIG. 11B indicates which message or suggestion will be displayed for a given temperature when the relative humidity is 50% through 69% and barometric pressure is falling.

FIG. 11C indicates which message or suggestion will be displayed for a given temperature when the relative humidity is 70% through 89% and barometric pressure is falling.

FIG. 11D indicates which message or suggestion will be displayed for a given temperature when the relative humidity is above 89% and barometric pressure is falling.

FIG. 12 shows the algorithm for the operation of the digital display 58 when the barometric pressure is falling. FIG. 12 represents the same information as shown in the tables of FIG. 11. Note that although FIGS. 11 and 12 only refer to temperature units of degrees Fahrenheit, it is understood that these are only external display units corresponding to the internal electrical values of the temperature sensor 42. The determination of a barometric pressure trend, either falling or steady or rising, is made via comparing barometric pressure values regularly. In FIG. 12, the barometric pressure values are compared on an hourly basis. In this example, the current barometric pressure is compared to the two previous hourly values to arrive at a trend value. This trend value determines which data map to enter for the purposes of providing suggested actions for the user.

OPERATION

The mold and fungus growth warning apparatus should be placed in a location where the temperature and relative humidity conditions are representative of the entire building or monitored area. An appropriate location would be near the HVAC controls for the building. The power supply 48 supplies the necessary power to operate the mold and fungus growth warning apparatus 10. The power supply 48 may be a battery or other AC or DC power supply, depending upon the needs of the user. The microprocessor 46 may be on continuously, or may sleep periodically, depending on its design characteristics. When the microprocessor 46 is on, it is constantly receiving temperature, relative humidity and barometric pressure inputs and determining the appropriate LED indicator and message display. In another embodiment, the microprocessor 46 has an active mode and a sleep mode to save energy. The microprocessor 46 "wakes up" periodically to obtain new readings from the temperature sensor 42, relative humidity sensor 44 and barometric pressure sensor 66. In one embodiment, the microprocessor 46 first determines barometric pressure trend and reads the appropriate maps for LED indicator operation and suggested actions. Next, the microprocessor 46 reads the relative humidity and reads the appropriate column in the data map. Next, the microprocessor 46 determines the temperature. The microprocessor 46 next compares the temperature to the appropriate relative humidity in the data map to determine which indicator 26, 28, 30 to illuminate or which suggested action to display. Values from barometric pressure sensor 66 are stored for a period of four hours. The microprocessor 46 compares the current hour, one hour, and two hour-old stored values of barometric pressure to determine if the ambient barometric air pressure is rising, falling, or has remained steady.

Operation of the Device

Referring now to FIG. 4, the power supply 48 supplies the necessary power to operate the system. The microprocessor 46 will "wake up" periodically to obtain new readings from the temperature sensor 42, relative humidity sensor 44, and barometric pressure sensor 66. The microprocessor 46 determines the relative humidity and displays the value on digital display 58. Next, the microprocessor 46 determines the temperature and displays the value on digital display 58. The microprocessor 46 then accepts an input from the barometric pressure sensor 66. In one embodiment, the values from the barometric pressure sensor 66 are stored for a predetermined period, such as four hours. In other embodiments, the device may store the barometric pressure data for days or weeks for later display or review. The microprocessor 46 compares the current hour, one hour old, and two hour old stored values of barometric pressure to determine if the ambient barometric air pressure is rising, falling, or has remained steady. When a determination is made, the microprocessor will read the appropriate map column with the most current temperature and relative humidity. FIGS. 5 and 7 are the most appropriate maps if the barometric pressure is rising or steady, and FIGS. 9 and 11 are appropriate if the barometric pressure is falling.

If no barometric pressure data is available, the mold and fungus growth warning apparatus 10 will simply display the information it has, along with illuminating the LED indicators 26, 28, 30 in accordance with FIGS. 5 and 9. The barometric pressure would need to be measured about every hour, but no more frequently due to the slow nature of the changes. However, the microprocessor 46 may be programmed to observe environmental conditions on any desired schedule. The observation schedules for the barometric pressure and the other environmental conditions may be different from each other. Thus, the mold and fungus growth warning apparatus 10 is capable of updating the both the LEDs 26, 28 30 and the digital display 58 regularly and frequently.

FIG. 5 show the maps that operate the LEDs 26, 28, 30 and the text display when the barometric pressure is steady or rising. The microprocessor 46 matches the relative humidity and temperature values to the appropriate map, FIGS. 5A-5D. For example, if the barometric pressure is steady or rising and the relative humidity is below 50%, then the LED map shown in FIG. 5A is used. If the barometric pressure is steady or rising and the relative humidity is 50% through 69%, then the LED map shown in FIG. 5B is used. If the barometric pressure is steady or rising and the relative humidity is 70% through 89%, then the LED map shown in FIG. 5C is used. If the barometric pressure is steady or rising and the relative humidity is above 89%, then the LED map shown in FIG. 5D is used.

FIG. 7 shows the internal maps for the microprocessor 46 to operate the suggestion display 22 when the barometric pressure is steady or rising. The microprocessor 46 matches the temperature and relative humidity values to the appropriate map. For example, if the barometric pressure is steady or rising and the relative humidity is below 50%, then the suggestion map shown in FIG. 7A is used. If the barometric pressure is steady or rising and the relative humidity is 50% through 69%, then the suggestion map shown in FIG. 7B is used. If the barometric pressure is steady or rising and the relative humidity is 70% through 89%, then the suggestion map shown in FIG. 7C is used. If the barometric pressure is steady or rising and the relative humidity is above 89%, then the suggestion map shown in FIG. 7D is used.

FIG. 9 shows the LED display internal maps for microprocessor 46 when the barometric pressure is falling. The microprocessor 46 matches the temperature and relative humidity values to the appropriate map to determine which LED 26, 28, 30 to illuminate. For example, if the barometric pressure is falling and the relative humidity is below 50%, then the LED map shown in FIG. 9A is used. If the barometric pressure is falling and the relative humidity is 50% through 69%, then the LED map shown in FIG. 9B is used. If the barometric pressure is falling and the relative humidity is 70% through 89%, then the LED map shown in FIG. 9C is used. If the barometric pressure is falling and the relative humidity is above 89%, then the LED map shown in FIG. 9D is used.

FIG. 11 shows the maps that operate the suggestion display 22 when the barometric pressure is falling. The microprocessor 46 matches the temperature and relative humidity values to the appropriate map. For example, if the barometric pressure is falling and the relative humidity is below 50%, then the suggestion map shown in FIG. 11A is used. If the barometric pressure is falling and the relative humidity is 50% through 69%, then the suggestion map shown in FIG. 11B is used. If the barometric pressure is falling and the relative humidity is 70% through 89%, then the suggestion map shown in FIG. 11C is used. If the barometric pressure is falling and the relative humidity is above 89%, then the suggestion map shown in FIG. 11D is used.

Figure 13:
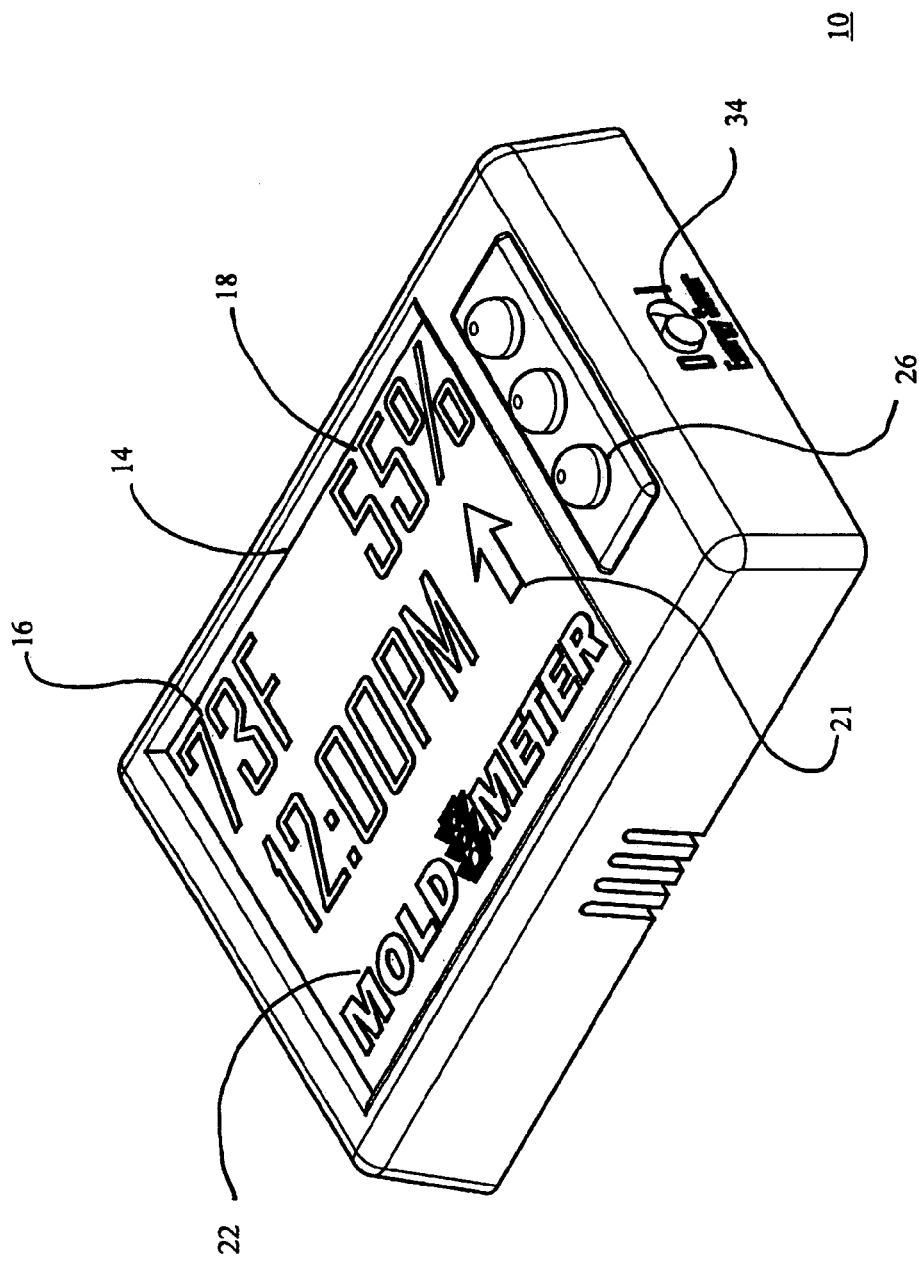
FIG. 13 shows an isometric view of the current invention while the apparatus is in a normal state of operation, in accordance with the invention.

The appropriate map indicates what action is to be performed by microprocessor 46. FIG. 13 provides an example of the mold and fungus growth warning apparatus 10 in operation. The temperature display 16 shows a value of 73° F. (22.2° C.), the relative humidity display 18 shows a value of 55%, and barometric pressure indicator 21 shows that the pressure is steady or rising. FIG. 5B is the appropriate LED indicator map for relative humidity values 50% through 69% when the barometric pressure is steady or rising. For a temperature value of 73° F. (22.2° C.) the mold and fungus growth warning apparatus 10 activates the green LED 26. FIG. 7B is the appropriate suggestion map for relative humidity values 50% through 69% when the barometric pressure is steady or rising. For a temperature value of 73° F. (22.2° C.) the suggestion display 58 displays a logo or some other text. If desired, the energy saver switch 34 can be switched to prevent the green LED 26 from illuminating continuously. This will increase battery life. Note that it is the combination of values from the temperature sensor 42, relative humidity sensor 44, and barometric pressure sensor 66 that will result in a particular action. Neither temperature, relative humidity, nor barometric pressure alone will trigger any indicator or suggestion action by the microprocessor 46.

During most normal environmental conditions, such as the previous example, the green LED 26 will be illuminated. It is well known in the art that LED devices consume more power than LCD devices. Because the green LED 26 confirms only that there are no mold or fungus warnings, alerts or suggestions. It can be turned off to conserve power. An energy saver switch 34 in the green LED 26 power line can be turned off without affecting operation of any of the other circuits or warnings. In such instances, it may be desirable to have a logo or text message show that conditions are normal or to have the green LED 26 flash periodically, perhaps once every 10 seconds. In one embodiment, the suggestion display 22 shows an icon of a traffic signal having a green light in the information display area 14. This presentation extends battery life, but still displays a visual clue that environmental conditions are normal and that the mold and fungus growth warning apparatus 10 is operating normally.

Figure 14:
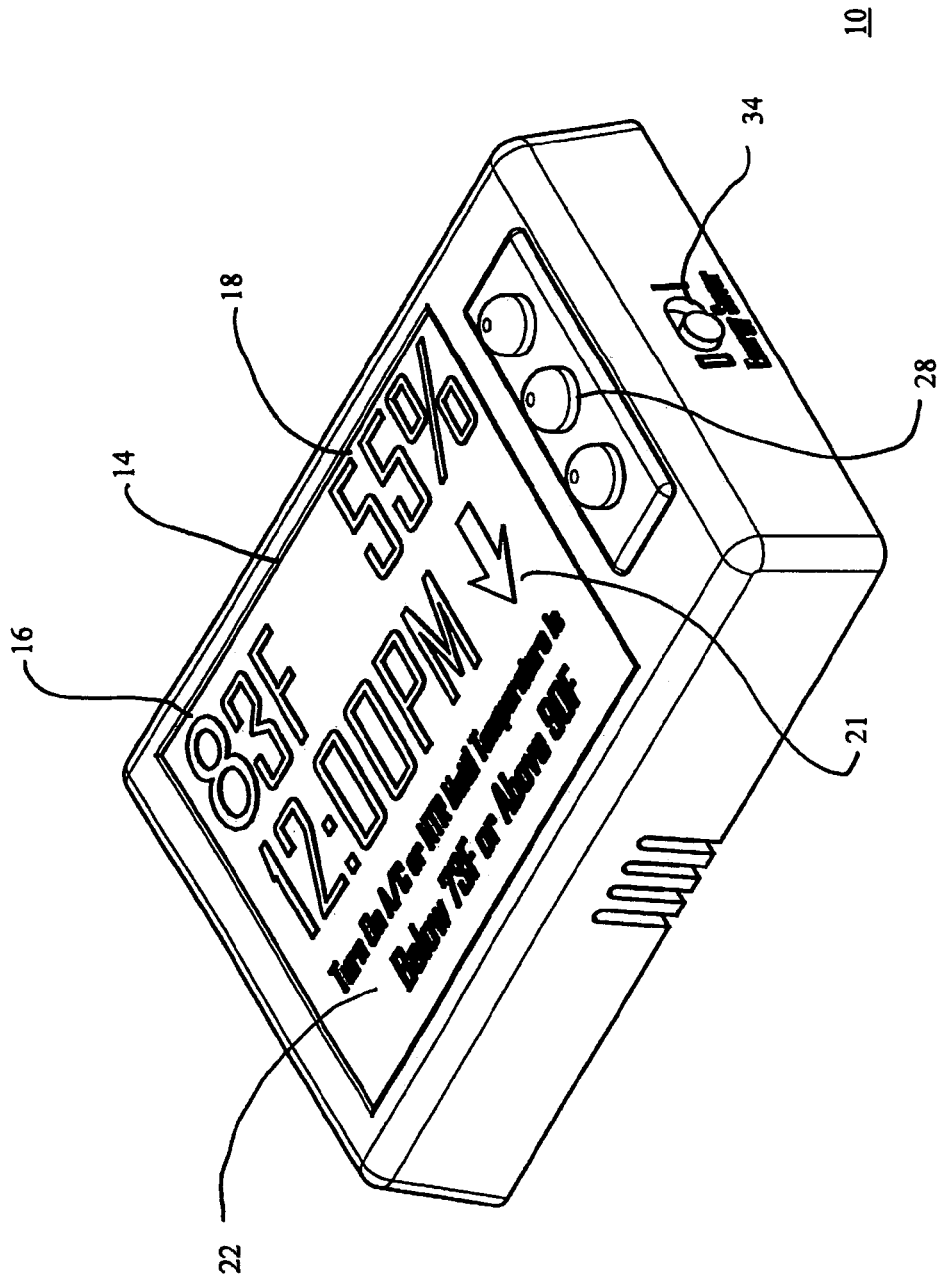
FIG. 14 depicts an isometric view of the preferred embodiment of the current invention during a first warning level, in accordance with the invention.

FIG. 14 provides another example. Upon a periodic "wake up" by the microprocessor 46, the temperature is 83° F. (28.3° C.), relative humidity is 55%, and the barometric pressure indicator 21 shows that the barometric pressure is falling. FIG. 9B is the appropriate LED indicator map when the barometric pressure is falling and the relative humidity is 50% to 69%. A temperature value of 83° F. (28.3° C.) directs the mold and fungus growth warning apparatus to activate only the yellow LED 28. FIG. 11B is the appropriate suggestion map when the barometric pressure is falling and the relative humidity is 50% to 69%. A temperature value of 83° F. (28.3° C.) directs the mold and fungus growth warning apparatus to display "Turn On A/C or HTR Until Temperature is Below 73° F. or Above 90° F." in suggestion display area 22. Note that even if the energy saver switch 34 is engaged, it will not affect the operation of the apparatus in an alert condition. It is understood that "A/C" means an air conditioning system, and "HTR" indicates a heater, both of which have a drying effect on the ambient air. As mentioned earlier, other suggestions such as directing the user to turn on a dehumidifier would also be appropriate for display.

Air conditioners and furnaces reduce the relative humidity while simultaneously lowering or increasing, respectively, the ambient temperature. A dehumidifier simply reduces the relative humidity. All are effective. In most instances, the mold and fungus growth warning apparatus 10 will return to a non-alert status before the ambient temperature is cooled to below 73° F. or raised above 90° F., because the relative humidity sensor 44 will notify the microprocessor 46 if subsequent new combinations of temperature and humidity are a sufficient threat.

Figure 15:
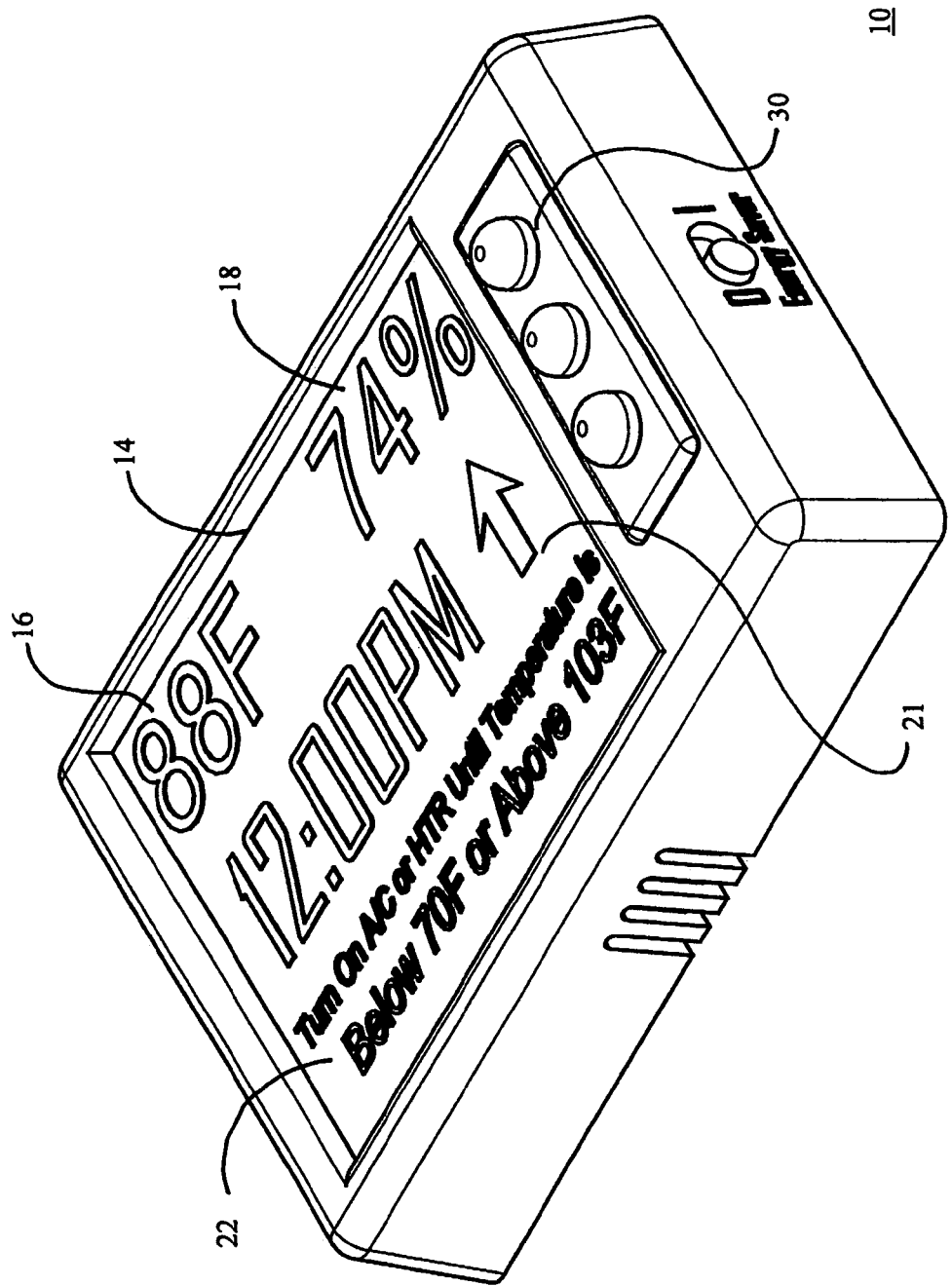
FIG. 15 illustrates an isometric view of the current invention at the second warning level, in accordance with the invention.

FIG. 15 provides another example. Upon a periodic "wake up" by the microprocessor 46, the temperature is 88° F. (31.1° C.), relative humidity is 74% and the barometric pressure is rising or steady. FIG. 5C is the appropriate LED map when the barometric pressure is rising or steady and the relative humidity is 70% to 89%. For a temperature of 88° F. (31.1° C.) only the red LED 30 is activated. FIG. 7C is the appropriate suggestion map when the barometric pressure is rising or steady and the relative humidity is 70% to 89%. For a temperature value of 88° F. (31.1° C.) the device displays "Turn On A/C or HTR Until Temperature is Below 70° F. or Above 103° F." in the suggestion display area 22. Again, even if energy saver switch 34 is active, it will not affect the operation of the apparatus in an alert condition.

Figure 16:
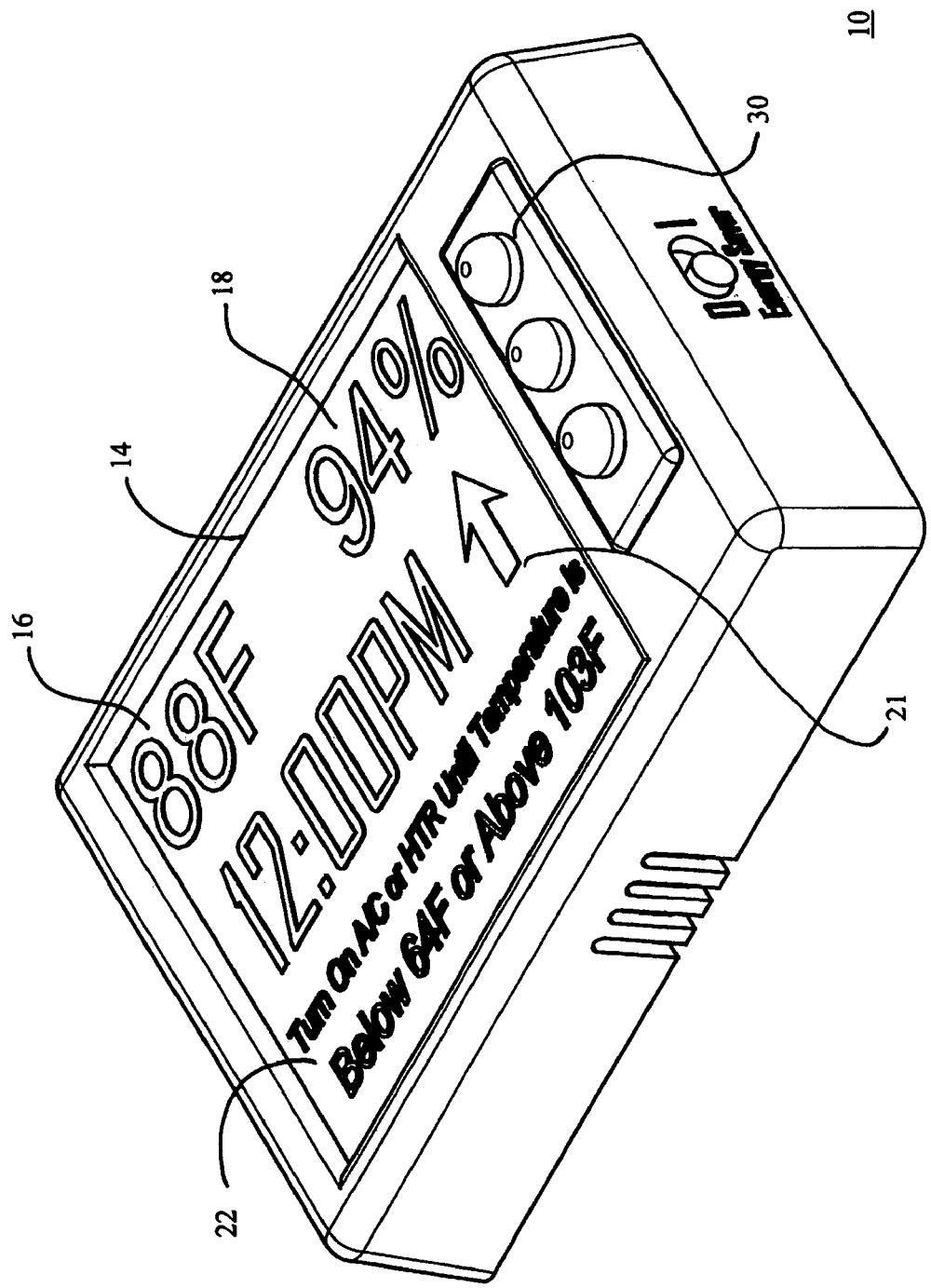
FIG. 16 is an isometric view of the current invention at the third warning level, in accordance with the invention.

FIG. 16 provides another example. Upon a periodic "wake up" by the microprocessor 46, the temperature is 88° F. (31.1° C.), relative humidity is 94% and the barometric pressure is rising or steady. FIG. 5D is the appropriate LED map when the barometric pressure is rising or steady and the relative humidity is greater than 89%. For a temperature of 88° F. (31.1° C.) the red LED 30 is flashed continuously. FIG. 7D is the appropriate suggestion map when the barometric pressure is rising or steady and the relative humidity is greater than 89%. For a temperature value of 88° F. (31.1° C.), the device displays "Turn On A/C or HTR Until Temperature is Below 64° F. or Above 103° F." in suggestion display area 22. Again, turning on an air conditioner, heater or dehumidifier will normally dry the air sufficiently so that the device will display a normal condition before the air temperature reaches less than 64° F. or greater than 103° F.

FIG. 17 provides a final example. Upon a periodic "wake up" by the microprocessor 46, the temperature is 96° F. (35.6° C.), relative humidity is 96% and the barometric pressure is rising or steady. FIG. 5D is the appropriate LED map when the barometric pressure is rising or steady and the relative humidity is greater than 89%. For a temperature of 96° F. (35.6° C.) only the yellow LED 28 is illuminated. Note that both the temperature and humidity have increased from the previous values that directed a flashing red LED 30 condition in FIG. 16. Yet the combination of the increased values in FIG. 17 are a more benign risk level for organic growth that the lower values of FIG. 16. To finish, FIG. 7D is the appropriate suggestion map when the barometric pressure is rising or steady and the relative humidity is greater than 89%. For a temperature value of 96° F. (31.1° C.), the device displays "Turn On A/C or HTR Until Temperature is Below 64° F. or Above 103° F." in suggestion display area 22. Again, turning on an air conditioner, heater or dehumidifier will normally dry the air sufficiently so that the device will display a normal condition before the air temperature reaches less than 64° F. or greater than 103° F.

Heretofore, practitioners of the prior art lacked the understanding that only a combination of appropriate temperature and relative humidity will result in mold and fungus growth. The mold and fungus growth warning apparatus 10 monitors, measures and acts in response to this unobvious combination of temperature and relative humidity values.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An apparatus for monitoring environmental conditions favorable for mold, mildew and fungus growth, comprising:
    a temperature sensor attached to the microprocessor;
    a relative humidity sensor attached to the microprocessor;
    a barometric pressure sensor attached to the microprocessor;
    an indicator array attached to the microprocessor;
    a text display attached to the microprocessor; a power supply attached to the microprocessor; and
    a microprocessor having a map including a plurality of relative humidity and temperature combinations, and further including
        a first group of relative humidity and temperature combinations for barometric pressure conditions that are rising and steady,
        a second group of relative humidity and temperature combinations for barometric pressure conditions that are falling, where the temperature range designated as favorable for mold growth in the falling barometric pressure conditions is larger than the temperature range designated as favorable for mold growth in steady and rising barometric pressure conditions,
        a first set of suggested actions for a user based on the rising and steady barometric pressure conditions, and
        a second set of suggested actions for the user based on the falling barometric pressure conditions.

2. The apparatus for monitoring environmental conditions favorable for mold, mildew and fungus growth of claim 1, where the indicator array comprises one or more warning lights.

3. The apparatus for monitoring environmental conditions favorable for mold, mildew and fungus growth of claim 1, where the text display displays one or more environmental conditions.

4. The apparatus for monitoring environmental conditions favorable for mold, mildew and fungus growth of claim 3, where the text display displays the one or more suggested actions.

5. A method of monitoring environmental conditions for conditions favorable for mold, mildew and fungus growth, comprising the steps of:
    (a) sensing an environmental temperature with a temperature sensor;
    (b) sensing a relative humidity with a relative humidity sensor;
    (c) sensing a barometric pressure condition with a barometric pressure sensor;
    (d) entering a data map attached to a microprocessor with the barometric pressure condition, temperature and relative humidity, where the data map includes a first group of relative humidity and temperature combinations for barometric pressure conditions that are rising and steady, and a second group of relative humidity and temperature combinations for barometric pressure conditions that are falling, where,
        the temperature range designated as favorable for mold growth in the falling barometric pressure conditions is larger than the temperature range designated as favorable for mold growth in the rising and steady barometric pressure conditions;
    (e) deriving an environmental condition level from the first and second groups of relative humidity and temperature combinations; and
    (f) displaying the environmental condition level.

6. The method of monitoring environmental conditions for conditions favorable for mold, mildew and fungus growth of claim 5, where at least one sensor is in wireless communication with the microprocessor.

7. The method of monitoring environmental conditions for conditions favorable for mold, mildew and fungus growth of claim 5, where the data map further comprises at least one suggested actions for a user.

8. The method of monitoring environmental conditions for conditions favorable for mold, mildew and fungus growth of claim 5, where step (f) further comprises:
    (f1) displaying the environmental condition with a text display.

9. The method of monitoring environmental conditions for conditions favorable for mold, mildew and fungus growth of claim 8, where step (f) further comprises:
    (f1) displaying the suggested actions with a text display.

10. The method of monitoring environmental conditions for conditions favorable for mold, mildew and fungus growth of claim 8, where step (f) further comprises:
    (f1) displaying the environmental condition with an audio display.

11. The method of monitoring environmental conditions for conditions favorable for mold, mildew and fungus growth of claim 5, where step (f) further comprises:
    (f1) deriving a suggested action for a user based on the relative humidity, temperature and barometric conditions.

12. The method of monitoring environmental conditions for conditions favorable for mold, mildew and fungus growth of claim 11, further comprising:
    (f2) displaying the suggested action for the user.

* * * * *